US012054590B2

(12) United States Patent
Alhakimi et al.

(10) Patent No.: US 12,054,590 B2
(45) Date of Patent: Aug. 6, 2024

(54) HYDROGEL POLYMERS

(71) Applicant: GL CHEMTEC VISION INC., Oakville (CA)

(72) Inventors: Musa Alhakimi, Oakville (CA); Haithm Ismail, Oakville (CA); Haron Alhakimi, Oakville (CA); Gamil Alhakimi, Oakville (CA); Lisa Studnicki, Oakville (CA)

(73) Assignee: GL CHEMTEC VISION INC. (CA)

( * ) Notice: Subject to any disclaimer, the term of this patent is extended or adjusted under 35 U.S.C. 154(b) by 770 days.

(21) Appl. No.: 17/055,776

(22) PCT Filed: May 15, 2019

(86) PCT No.: PCT/CA2019/050652
§ 371 (c)(1),
(2) Date: Nov. 16, 2020

(87) PCT Pub. No.: WO2019/218063
PCT Pub. Date: Nov. 21, 2019

(65) Prior Publication Data
US 2021/0340336 A1 Nov. 4, 2021

Related U.S. Application Data

(60) Provisional application No. 62/784,577, filed on Dec. 24, 2018, provisional application No. 62/672,133, filed on May 16, 2018.

(51) Int. Cl.
| | | |
|---|---|---|
| *C08J 3/075* | (2006.01) | |
| *C08F 2/50* | (2006.01) | |
| *C08F 220/20* | (2006.01) | |
| *C08F 220/32* | (2006.01) | |
| *C08F 220/56* | (2006.01) | |
| *C08F 230/08* | (2006.01) | |
| *C08G 77/20* | (2006.01) | |
| *C08G 77/398* | (2006.01) | |
| *C08J 3/24* | (2006.01) | |
| *C08K 5/05* | (2006.01) | |
| *C08K 5/5425* | (2006.01) | |
| *C08L 71/02* | (2006.01) | |
| *G02B 1/04* | (2006.01) | |
| *G02C 7/04* | (2006.01) | |

(52) U.S. Cl.
CPC ............ *C08J 3/075* (2013.01); *C08F 2/50* (2013.01); *C08F 220/20* (2013.01); *C08F 220/325* (2020.02); *C08F 220/56* (2013.01); *C08F 230/085* (2020.02); *C08G 77/20* (2013.01); *C08G 77/398* (2013.01); *C08J 3/24* (2013.01); *C08K 5/05* (2013.01); *C08K 5/5425* (2013.01); *C08L 71/02* (2013.01); *G02B 1/043* (2013.01); *G02C 7/049* (2013.01); *C08J 2300/14* (2013.01); *C08L 2312/00* (2013.01)

(58) Field of Classification Search
CPC .. C08F 283/06; C08F 220/325; C08F 226/10; C08F 222/102; C08F 220/20
See application file for complete search history.

(56) References Cited

U.S. PATENT DOCUMENTS

| | | | | |
|---|---|---|---|---|
| 3,808,179 A | * | 4/1974 | Gaylord | C08F 220/12 351/159.33 |
| 4,666,249 A | * | 5/1987 | Bauman | G02B 1/043 264/2.6 |
| 4,910,277 A | * | 3/1990 | Bambury | C08F 230/08 526/260 |
| 5,776,999 A | * | 7/1998 | Nicolson | A61L 27/26 528/33 |
| 6,149,692 A | * | 11/2000 | Lally | D06P 3/58 8/444 |
| 6,149,842 A | * | 11/2000 | Lally | B29D 11/00913 351/159.01 |
| 6,342,570 B1 | * | 1/2002 | Bothe | C08F 8/00 526/287 |
| 6,407,145 B1 | * | 6/2002 | Muller | B29D 11/00134 525/61 |
| 8,937,110 B2 | * | 1/2015 | Alli | C08G 77/26 522/167 |
| 2001/0051670 A1 | * | 12/2001 | Goupil | A61L 27/34 523/113 |
| 2003/0008154 A1 | * | 1/2003 | Aguado | A61L 27/34 528/10 |
| 2010/0016514 A1 | * | 1/2010 | Qiu | B29D 11/00038 525/327.4 |
| 2012/0245248 A1 | * | 9/2012 | Alli | C08F 290/068 523/107 |
| 2014/0377327 A1 | * | 12/2014 | Davis | A61K 31/573 264/1.7 |
| 2017/0192251 A1 | * | 7/2017 | Lin | G02C 7/049 |
| 2019/0194418 A1 | * | 6/2019 | Chien | B29D 11/00134 |
| 2021/0340336 A1 | * | 11/2021 | Alhakimi | G02B 1/043 |

FOREIGN PATENT DOCUMENTS

| | | |
|---|---|---|
| CA | 2767044 A1 | 10/2010 |
| CA | 2767044 A1 | 10/2010 |

(Continued)

OTHER PUBLICATIONS

International Search Report and Written Opinion for PCT/CA2019/050652 mailed Jul. 8, 2019.

(Continued)

*Primary Examiner* — Peter A Salamon
(74) *Attorney, Agent, or Firm* — Thomas | Horstemeyer, LLP

(57) ABSTRACT

Hydrogel polymers for use, for example, in contact lenses, drug delivery systems and/or stimulating devices. In some embodiments, the hydrogel formulations comprise diluent(s) to improve the dehydration characteristics and mechanical properties of a hydrogel polymer formulation compared to those without diluent(s). The diluent(s) include, for example, water and hydrophilic diluent(s) such as humectants.

22 Claims, No Drawings

(56) References Cited

FOREIGN PATENT DOCUMENTS

| | | | |
|---|---|---|---|
| CA | 2777723 | A1 | 6/2011 |
| CA | 2777723 | A1 | 6/2011 |
| CA | 2940533 | A1 | 9/2015 |
| CA | 2940533 | A1 | 9/2015 |
| WO | 2009124048 | A1 | 10/2009 |
| WO | 2009124048 | A1 | 10/2009 |
| WO | 2014100171 | A1 | 6/2014 |
| WO | 2014100171 | A1 | 6/2014 |
| WO | 2014100219 | A1 | 6/2014 |
| WO | 2014100219 | A1 | 6/2014 |
| WO | 2015001811 | A1 | 1/2015 |
| WO | 2015001811 | A1 | 1/2015 |
| WO | 2018027311 | A1 | 2/2018 |

OTHER PUBLICATIONS

Office Action, issued by Canadian Patent Office, Canada Patent Application No. 3,100,086, issued Feb. 23, 2023.
Office Action, issued by Canadian Patent Office, Canada Patent Application No. 3,100,086, issued Jun. 29, 2023.

* cited by examiner

HYDROGEL POLYMERS

CROSS-REFERENCE TO RELATED APPLICATIONS

This application is a 35 U.S.C. § 371 national stage application of PCT Application No. PCT/CA2019/050652, filed May 15, 2019, which claims the benefit of and priority to U.S. Provisional Patent Application No. 62/672,133, filed May 16, 2018, and U.S. Provisional Patent Application No. 62/784,577, filed Dec. 24, 2018 and the contents of which are incorporated by reference herein in their entireties.

FIELD

The subject application relates generally to polymer formulations, and, in particular, hydrogel polymers for use, for example, in contact lenses, drug delivery systems and/or stimulating devices.

BACKGROUND

Hydrogels are hydrophilic polymers that absorb water, and are essentially insoluble in water at physiological temperature, pH, and ionic strength due to the presence of a three-dimensional polymeric network. While hydrogels are prepared from hydrophilic monomers, hydrophobic monomers are sometimes used in hydrogel preparation in order to regulate the properties of specific applications. The three-dimensional network includes crosslinks between polymer chains of the network, and these crosslinks can be formed by covalent bonds, electrostatic, hydrophobic, or dipole-dipole interactions. The hydrophilicity of the hydrogel materials is in large part due to the presence of hydrophilic groups, in some instances, along the polymer backbone, and in other instances, as functional side groups that extend from the polymer backbone. Generally, a hydrogel is a crosslinked polymer that absorbs water to an equilibrium value of at least 10% water. The water-swollen equilibrated state of a hydrogel results from a balance between an osmotic force that drives the water to enter the hydrophilic polymer network, and a cohesive force exerted by the polymer chains in resisting expansion. In some fashion, both the osmotic force and the cohesive force correlates with the type of monomers used to prepare the hydrogel polymeric material and the crosslink density of the polymeric hydrogel material. In general, a person of ordinary skill may expect a greater degree of crosslinking for a given hydrogel polymeric material may result in a corresponding decrease in water content, i.e., at equilibrium, the weight percentage of water absorbed by the polymeric network under physiological conditions relative to its total (dry plus water) weight. Water content (%) is simply {[wet lens (g)–dry lens (g)]/wet lens (g)}×100 at equilibrium.

Hydrogels can be classified as synthetic or natural according to their origin; degradable or stable depending on their stability characteristics, and intelligent or conventional depending on their ability to exhibit significant dimensional changes with variations in pH, temperature or electric field. One class of conventional synthetic hydrogels is prepared by free-radical polymerization of vinyl or (meth)acrylate monomers using thermal or photo initiators. Several important classes of monomers are recognized by persons of skill with an interest to prepare hydrogel polymeric materials. There are the neutral monomers, for example, methacrylates and acrylates, e.g., 2-hydroxyethyl methacrylate (HEMA), acrylamide/methacrylamides, e.g., dimethyl acrylamide (DMA), glycerol methacrylate (GMA) and cyclic lactams, e.g., N-vinyl-2-pyrrolidone (NVP). At times, the term N-vinylpyrrolidone is used interchangeably with N-vinyl-2-pyrrolidone, and both chemical terms are well recognized by persons of ordinary skill to mean the same vinyl monomer. Another class of monomers is the ionic or charged (under physiological conditions) monomers, including, methacrylic acid, acrylic acid, methylpropylsulfonic acid and p-styrene sulfonate. Typically, in the making of contact lenses, the ionic class of monomer is present at low concentration relative to the neutral class of monomer, but the former can have a dramatic effect on water content of the material. For example, copolymerization of 2% w/w methacrylic acid with HEMA results in a hydrogel possessing a water content of 60% (compared with 38% water content for HEMA alone). As used herein "(meth)" refers to an optional methyl substitution. Thus, a term such as "(meth)acrylate" denotes both methacrylic and acrylic radicals.

High water containing hydrogels are known to be susceptible to dimensional changes during exposure to ambient conditions because they tend to lose a higher percent of water (dehydrate) relative to hydrogels having a lower water content. Further, the ability to regain the lost water (rehydrate) contributes to the dimensional stability of hydrogels. If a hydrogel material absorbs water more rapidly, then the lens may be more closely return to a water-saturated state during exposure to water, for example, through direct contact and/or exposure to a moisture saturated environment. Therefore, as a hydrogel begins to dehydrate, a characteristic of rapid rehydration or water retention is advantageous for maintaining saturation and stability. Unfortunately, conventional hydrogels used in medical devices, such as contact lenses, have been constructed of materials with a less than optimal rate of rehydration.

Silicone hydrogels combine the high oxygen permeability of polydimethylsiloxane and the good water absorption characteristics of a hydrogel. However, for the application of a contact lens, one well known issue with preparing silicone hydrogels is that silicone based monomers are hydrophobic, and relatively, incompatible in regards to forming a homogeneous polymerization mixture with the hydrophilic monomers present in the mixture. The copolymerization of (meth) acrylate functionalized silicones with hydrophilic monomers generally results in opaque, phase separated materials. Technical approaches to minimize such mix incompatibility can include the use of a solubilizing co-solvent or incorporating hydrophilic groups to the silicone backbone.

There is still a need for components and/or materials useful for making biocompatible medical devices that have desired physical properties.

SUMMARY

In an aspect, there is provided a hydrogel polymer comprising at least one diluent, wherein said at least one diluent comprises water and/or at least one humectant.

In another aspect, wherein the hydrogel polymer has improved water adsorption and/or retention capabilities compared to a conventional hydrogel polymer without said at least one diluent. In another aspect, wherein said at least one diluent is said at least one humectant capable of forming pores in the hydrogel polymer. In another aspect, wherein said at least one diluent creates microporous structures in the hydrogel polymer. In another aspect, wherein increasing the molecular weight and/or concentration of said at least one humectant creates pores with various sizes and shapes to allow substantial water adsorption and/or retention. In another aspect, wherein said at least one humectant has a suitable molecular weight. In another aspect, wherein said at least one humectant is soluble in the monomer used to form the hydrogel polymer. In another aspect, wherein said at least one humectant is biocompatible. In another aspect, wherein said at least one humectant is a hygroscopic substance. In another aspect, wherein said at least one humectant is a hydrophilic substance. In another aspect, wherein said at least one humectant is selected from the group consisting of monoalcohols (e.g. $C_1$-$C_8$ alcohols), glycols such as propylene glycol, butylene glycol, hexylene glycol, polymers thereof, such as polyethylene glycol, polypropylene glycol, polybutylene glycol, etc., alpha hydroxyl acids, such as lactic acid, glyceryl triacetate, polymeric polyols, such as polydextrose, sugar alcohols (sugar polyols) such as glycerol, sorbitol, xylitol, maltitol, etc., and a combination thereof. In another aspect, wherein said at least one humectant is non-polymerizing.

In yet another aspect, there is provided a hydrogel polymer prepared from a siloxane crosslinker.

In another aspect, wherein the siloxane crosslinker improves mechanical propertie(s) and/or dimensional stability of the hydrogel polymer compared to a conventional hydrogel polymer not prepared from a siloxane crosslinker. In another aspect, wherein the siloxane crosslinker include low rotation barriers. In another aspect, wherein a functional group of the siloxane crosslinker has low rotation barriers, typically, less than about 5 kJ/mol, more typically, about 3.3 kJ/mol. In another aspect, wherein the functional group of the siloxane crosslinker is an $(alkyl)_2Si$—O bond, typically, a $Me_2Si$—O bond. In another aspect, wherein the siloxane crosslinker include low chain-to-chain interaction due to the low cohesive energy, and the distance between the adjacent chains is larger in silicones compared to alkanes, which also contributes to better flexibility. In another aspect, wherein the siloxane crosslinker comprises 1,3-bis(3-methacryloxypropyl)tetramethyldisiloxane. In another aspect, wherein the siloxane crosslinker has a low molecular weight, typically from about 200 to about 6000 g/mol, more typically, about 200 to about 1000 g/mol. In another aspect, wherein the siloxane crosslinker has a molecular weight that is compatible with hydrophilic monomer(s) used to form the hydrogel polymer. In another aspect, wherein the siloxane crosslinker improves the modulus and elasticity of hydrogel polymers with water content greater than 50%.

In another aspect, wherein the hydrogel polymer is a silicone polymer. In another aspect, wherein the moduli is greater than about 2 MPa as measured by ASTM test method D1938. In another aspect, wherein the moduli is from about 0.3 MPa to about 0.6 MPa. In another aspect, wherein a silicone monomer is selected for making the silicone hydrogel polymer reduce the modulus of a class of silicone hydrogel polymers selected from polyurethane-polysiloxane hydrogel polymers. In another aspect, wherein the silicone monomer comprises a siloxanylalkyl methacrylate. In another aspect, wherein the silicone monomer is methyl di(trimethylsiloxy) silylpropylglyceryl methacrylate (SIGMA).

In another aspect, there is provided a hydrogel polymer comprising at least one diluent, the hydrogel polymer being prepared from a siloxane crosslinker and wherein said at least one diluent comprises water and/or at least one humectant. In another aspect, wherein hydrogel polymer is also prepared from a silicone monomer. In another aspect, wherein the silicone monomer comprises a polysiloxanylalkyl methacrylate. In another aspect, wherein the siloxane crosslinker comprises 1,3-bis(3-methacryloxypropyl)tetramethyldisiloxane.

In another aspect, there is provided a hydrogel polymer prepared from a siloxane crosslinker and a silicone monomer. In another aspect, wherein the silicone monomer comprises a polysiloxanylalkyl methacrylate. In another aspect, wherein the siloxane crosslinker comprises 1,3-bis(3-methacryloxypropyl)tetramethyldisiloxane.

In another aspect, there is provided use of at least one diluent in a hydrogel polymer of any described herein. In another aspect, there is provided use of a a siloxane crosslinker in the formation of a hydrogel polymer of any described herein.

In another aspect, there is provided a hydrogel polymer prepared by reacting at least one hydrophilic monomer, at least one vinyl containing monomer, a siloxane cross-linker, and at least one diluent, wherein said at least one diluent comprises water and/or at least one humectant. In another aspect, wherein the hydrophilic monomer comprises a (meth)acrylic monomer. In another aspect, there is provided a formulation/composition comprising at least one hydrophilic monomer, at least one vinyl containing monomer, a siloxane cross-linker, and at least one diluent, wherein said at least one diluent comprises water and/or at least one humectant. In another aspect, wherein the hydrophilic monomer comprises a (meth)acrylic monomer.

In another aspect of the hydrogel polymer/formulation/composition, wherein the at least one vinyl containing monomer comprises at least one silicone monomer. In another aspect, wherein the hydrogel polymer has improved water adsorption and/or retention capabilities compared to a conventional hydrogel polymer without said at least one diluent. In another aspect, wherein said at least one diluent is said at least one humectant is capable of forming pores in the hydrogel polymer. In another aspect, wherein said at least one humectant creates microporous structures in the hydrogel polymer. In another aspect, wherein increasing the molecular weight and/or concentration of said at least one humectant creates pores with various sizes and shapes to allow substantial water adsorption and/or retention. In another aspect, wherein said at least one humectant has a suitable molecular weight. In another aspect, wherein wherein said at least one humectant is soluble in the monomer used to form the hydrogel polymer. In another aspect, wherein said at least one humectant is biocompatible. In another aspect, wherein wherein said at least one humectant is a hygroscopic substance. In another aspect, wherein said at least one humectant is a hydrophilic substance. In another aspect, wherein said at least one humectant is selected from the group consisting of monoalcohols (e.g. $C_1$-$C_8$ alcohols), glycols such as propylene glycol, butylene glycol, hexylene glycol, polymers thereof, such as polyethylene glycol, polypropylene glycol, polybutylene glycol, etc., alpha hydroxyl acids, such as lactic acid, glyceryl triacetate, polymeric polyols, such as polydextrose, sugar alcohols (sugar polyols) such as glycerol, sorbitol, xylitol, maltitol, etc., and a combination thereof. In another aspect, wherein said at least one humectant is non-polymerizing. In another aspect, wherein the siloxane crosslinker improves mechanical propertie(s) and/or dimensional stability of the hydrogel polymer compared to a conventional hydrogel polymer not prepared from a siloxane crosslinker. In another aspect, wherein the siloxane crosslinker include low rotation barriers. In another aspect, wherein a functional group of the siloxane crosslinker has low rotation barriers, typically, less than about 5 kJ/mol, more typically, about 3.3 kJ/mol. In another aspect, wherein the functional group of the siloxane crosslinker is an (alkyl)$_2$Si—O bond, typically, a Me$_2$Si—O bond. In another aspect, wherein the siloxane crosslinker include low chain-to-chain interaction due to the low cohesive energy, and the distance between the adjacent chains is larger in silicones compared to alkanes, which also contributes to better flexibility. In another aspect, wherein the siloxane crosslinker comprises 1,3-bis(3-methacryloxypropyl)tetramethyldisiloxane. In another aspect, wherein the siloxane crosslinker has a low molecular weight, typically from about 200 to about 6000 g/mol, more typically, about 200 to about 1000 g/mol. In another aspect, wherein the siloxane crosslinker has a molecular weight that is compatible with hydrophilic monomer(s) used to form the hydrogel polymer. In another aspect, wherein the siloxane crosslinker improves the modulus and elasticity of hydrogel polymers with water content greater than 50%. In another aspect, wherein the hydrogel polymer is a silicone polymer. In another aspect, wherein the moduli is greater than about 2 MPa as measured by ASTM test method D1938. In another aspect, wherein the moduli is from about 0.3 MPa to about 0.6 MPa. In another aspect, wherein a silicone monomer is selected for making the silicone hydrogel polymer reduce the modulus of a class of silicone hydrogel polymers selected from polyurethane-polysiloxane hydrogel polymers. In another aspect, wherein the silicone monomer comprises a siloxanylalkyl methacrylate. In another aspect, wherein the silicone monomer is methyl di(trimethylsiloxy) silylpropylglyceryl methacrylate (SIGMA). In another aspect, wherein the silicone monomer is selected from the group consisting of tris-(trimethylsiloxy)-3-methacryloxypropyl methacrylate (Tris), 3-methacryloxy-2-hydroxypropyloxy) propylbis(trimethylsiloxy)-methylsilane (Sigma), or a mixture thereof. In another aspect, wherein the hydrophilic monomer is selected from hydroxyethylmethacrylate (HEMA), glycidyl methacrylate (GMMA), dimethylacrylamide (DMA), 3-(tris-(trimethylsiloxy)silyl)propyl methacrylate (TRIS), hydroxypropyloxy) propylbis(trimethylsiloxy)-methylsilane (SIGMA), or combinations thereof. In another aspect, wherein the hydrogel polymer/formulation/composition further comprises at least one photoinitiator. In another aspect, wherein at least one hydrophilic monomer is present from about 35% to about 75% by weight. In another aspect, wherein at least one vinyl containing monomer is present from about 2% to about 4% by weight. In another aspect, wherein the siloxane cross-linker is present from about 0.4% to about 2% by weight. In another aspect, wherein said at least one diluent humectant is present from about 10% to about 55% by weight. In another aspect, wherein said at least one diluent humectant is present from about 10% to about 45% by weight. In another aspect, wherein the siloxane cross-linker is present from about 0.4% to about 2% by weight. In another aspect, wherein the polymer possesses a water content of at least about 40% by weight, at least about 45% by weight, at least about 50% by weight, at least about 65% by weight, at least about 70% by weight, at least about 71% by weight, at least about 77% by weight, or at least about 80% by weight. In another aspect, wherein the polymer possesses a modulus of elasticity of at least about 0.30 MPa, at least about 0.35 MPa, at least about 0.40 MPa, or at least about 0.45 MPa. In another aspect, wherein the hydrogel materials have electrical conductivity for an extended period of time, typically, from about one day to about seventeen days.

In another aspect, there is provided a contact lens prepared with any of the hydrogel polymer(s) described herein. In another aspect, wherein the contact lens, in a saline solution, has low expansion. In another aspect, wherein the contact lens, in a saline solution, has less than about 6% expansion. In another aspect, wherein the contact lens, in a saline solution, has about 2% to about 6% expansion. In another aspect, wherein the contact lens, in a saline solution, has less than about 5% expansion. In another aspect, wherein the contact lens, in a saline solution, has less than about 4% expansion. In another aspect, wherein the contact lens, in a saline solution, has less than about 3% expansion. In another aspect, wherein the contact lens, in a saline solution, has less than about 2% expansion. In another aspect, wherein the contact lens, in a saline solution, has zero expansion. In another aspect, wherein the contact lens is capable of accommodating a further component without affecting at least one property of the lens, wherein said at least one property is selected from shape and optics. In another aspect, wherein the contact lens is capable of accommodating a further component without substantially distorting at least one of the shape and optics. In another aspect, wherein the contact lens is capable of accommodating a further component without collapsing the lens. In another aspect, wherein the further component is at least one sheet. In another aspect, wherein the at least one sheet comprises at least one metal and/or at least one polymer. In another aspect, wherein the at least one sheet comprises said at least one metal. In another aspect, wherein the at least one sheet comprises said at least one polymer. In another aspect, wherein the at least one sheet is selected from metal, polyethylene, polypropylene, and/or polysiloxane sheets. In another aspect, wherein the at least one sheet is about 1 to about 50 microns thick.

Other features and advantages of the present invention will become apparent from the following detailed description. It should be understood, however, that the detailed description and the specific examples while indicating embodiments of the invention are given by way of illustration only, since various changes and modifications within the spirit and scope of the invention will become apparent to those skilled in the art from the detailed description.

DETAILED DESCRIPTION OF CERTAIN EMBODIMENTS

Definitions

When describing the compounds, compositions, methods and uses of this invention, the following terms have the following meanings unless otherwise indicated.

The compounds of the present invention may have asymmetric centers, chiral axes, and chiral planes (as described, for example, in: E. L. Eliel and S. H. Wilen, Stereochemistry of Carbon Compounds, John Wiley & Sons, New York, 1994, pages 1119-1190), and occur as racemates, racemic mixtures, and as individual diastereomers, with all possible isomers and mixtures thereof, including optical isomers, E isomers, and Z isomers, being included in the present invention. In addition, the compounds disclosed herein may exist as tautomers and both tautomeric forms are intended to be encompassed by the scope of the invention, even though only one tautomeric structure may be depicted.

Generally, reference to a certain element such as hydrogen or H is meant to, if appropriate, include all isotopes of that element.

Where the term "alkyl group" is used, either alone or within other terms such as "haloalkyl group" and "alkylamino group", it encompasses linear or branched carbon radicals having, for example, one to about twenty carbon atoms or, in specific embodiments, one to about twelve carbon atoms. In other embodiments, alkyl groups are "lower alkyl" groups having one to about six carbon atoms. Examples of such groups include, but are not limited thereto, methyl, ethyl, n-propyl, isopropyl, n-butyl, isobutyl, sec-butyl, tert-butyl, pentyl, iso-amyl, hexyl and the like. In more specific embodiments, lower alkyl groups have one to four carbon atoms.

The term "alkenyl group" encompasses linear or branched carbon radicals having at least one carbon-carbon double bond. The term "alkenyl group" can encompass conjugated and non-conjugated carbon-carbon double bonds or combinations thereof. An alkenyl group, for example and without being limited thereto, can encompass two to about twenty carbon atoms or, in a particular embodiment, two to about twelve carbon atoms. In embodiments, alkenyl groups are "lower alkenyl" groups having two to about four carbon atoms. Examples of alkenyl groups include, but are not limited thereto, ethenyl, propenyl, allyl, propenyl, butenyl and 4-methylbutenyl. The terms "alkenyl group" and "lower alkenyl group", encompass groups having "cis" and "trans" orientations, or alternatively, "E" and "Z" orientations.

The term "alkynyl group" denotes linear or branched carbon radicals having at least one carbon-carbon triple bond. The term "alkynyl group" can encompass conjugated and non-conjugated carbon-carbon triple bonds or combinations thereof. Alkynyl group, for example and without being limited thereto, can encompass two to about twenty carbon atoms or, in a particular embodiment, two to about twelve carbon atoms. In embodiments, alkynyl groups are "lower alkynyl" groups having two to about ten carbon atoms. Some examples are lower alkynyl groups having two to about four carbon atoms. Examples of such groups include propargyl, butynyl, and the like.

The term "halo" means halogens such as fluorine, chlorine, bromine or iodine atoms.

The term "haloalkyl group" encompasses groups wherein any one or more of the alkyl carbon atoms is substituted with halo as defined above. Specifically encompassed are mono-haloalkyl, dihaloalkyl and polyhaloalkyl groups including perhaloalkyl. A monohaloalkyl group, for one example, may have either an iodo, bromo, chloro or fluoro atom within the group. Dihalo and polyhaloalkyl groups may have two or more of the same halo atoms or a combination of different halo groups. "Lower haloalkyl group" encompasses groups having 1-6 carbon atoms. In some embodiments, lower haloalkyl groups have one to three carbon atoms. Examples of haloalkyl groups include fluoromethyl, difluoromethyl, trifluoromethyl, chloromethyl, dichloromethyl, trichloromethyl, pentafluoroethyl, heptafluoropropyl, difluorochloromethyl, dichlorofluoromethyl, difluoroethyl, difluoropropyl, dichloroethyl and dichloropropyl.

The term "hydroxyalkyl group" encompasses linear or branched alkyl groups having, for example and without being limited thereto, one to about ten carbon atoms, any one of which may be substituted with one or more hydroxyl groups. In embodiments, hydroxyalkyl groups are "lower hydroxyalkyl" groups having one to six carbon atoms and one or more hydroxyl groups. Examples of such groups include hydroxymethyl, hydroxyethyl, hydroxypropyl, hydroxybutyl and hydroxyhexyl.

The term "alkoxy group" encompasses linear or branched oxy-containing groups each having alkyl portions of, for example and without being limited thereto, one to about ten carbon atoms. In embodiments, alkoxy groups are "lower alkoxy" groups having one to six carbon atoms. Examples of such groups include methoxy, ethoxy, propoxy, butoxy and tert-butoxy. In certain embodiments, lower alkoxy groups have one to three carbon atoms. The "alkoxy" groups may be further substituted with one or more halo atoms, such as fluoro, chloro or bromo, to provide "haloalkoxy" groups. In other embodiments, lower haloalkoxy groups have one to three carbon atoms. Examples of such groups include fluoromethoxy, chloromethoxy, trifluoromethoxy, trifluoroethoxy, fluoroethoxy, and fluoropropoxy.

The term "aromatic group" or "aryl group" means an aromatic group having one or more rings wherein such rings may be attached together in a pendent manner or may be fused. In particular embodiments, an aromatic group is one, two or three rings. Monocyclic aromatic groups may contain 4 to 10 carbon atoms, typically 4 to 7 carbon atoms, and more typically 4 to 6 carbon atoms in the ring. Typical polycyclic aromatic groups have two or three rings. Polycyclic aromatic groups having two rings typically have 8 to 12 carbon atoms, typically 8 to 10 carbon atoms in the rings. Examples of aromatic groups include, but are not limited to, phenyl, naphthyl, tetrahydronaphthyl, indanyl, biphenyl, phenanthryl, anthryl or acenaphthyl.

The term "heteroatom" means an atom other than carbon. Typically, heteroatoms are selected from the group consisting of sulfur, phosphorous, nitrogen and oxygen atoms. Groups containing more than one heteroatom may contain different heteroatoms.

The term "heteroaromatic group" or "heteroaryl group" means an aromatic group having one or more rings wherein such rings may be attached together in a pendent manner or may be fused, wherein the aromatic group has at least one heteroatom. Monocyclic heteroaromatic groups may contain 4 to 10 member atoms, typically 4 to 7 member atoms, and more typically 4 to 6 member atoms in the ring. Typical polycyclic heteroaromatic groups have two or three rings. Polycyclic aromatic groups having two rings typically have 8 to 12 member atoms, more typically 8 to 10 member atoms in the rings. Examples of heteroaromatic groups include, but are not limited thereto, pyrrole, imidazole, thiazole, oxazole, furan, thiophene, triazole, pyrazole, isoxazole, isothiazole, pyridine, pyrazine, pyridazine, pyrimidine, triazine, indole, benzofuran, benzothiophene, benzimidazole, benzthiazole, quinoline, isoquinoline, quinazoline, quinoxaline and the like.

The term "carbocyclic group" means a saturated or unsaturated carbocyclic hydrocarbon ring. Carbocyclic groups are not aromatic. Carbocyclic groups are monocyclic or polycyclic. Polycyclic carbocyclic groups can be fused, spiro, or bridged ring systems. Monocyclic carbocyclic groups may contain 4 to 10 carbon atoms, typically 4 to 7 carbon atoms, and more typically 5 to 6 carbon atoms in the ring. Bicyclic carbocyclic groups may contain 8 to 12 carbon atoms, typically 9 to 10 carbon atoms in the rings.

The term "heterocyclic group" means a saturated or unsaturated ring structure containing carbon atoms and 1 or more heteroatoms in the ring. Heterocyclic groups are not aromatic. Heterocyclic groups are monocyclic or polycyclic. Polycyclic heterocyclic groups can be fused, spiro, or bridged ring systems. Monocyclic heterocyclic groups may contain 4 to 10 member atoms (i.e., including both carbon atoms and at least 1 heteroatom), typically 4 to 7, and more typically 5 to 6 in the ring. Bicyclic heterocyclic groups may contain 8 to 18 member atoms, typically 9 or 10 member atoms in the rings. Representative heterocyclic groups include, by way of example, pyrrolidine, imidazolidine, pyrazolidine, piperidine, 1,4-dioxane, morpholine, thiomorpholine, piperazine, 3-pyrroline and the like.

The term "heterogeneous group" means a saturated or unsaturated chain of non-hydrogen member atoms comprising carbon atoms and at least one heteroatom. Heterogeneous groups typically have 1 to 25 member atoms. More typically, the chain contains 1 to 12 member atoms, 1 to 10, and most typically 1 to 6. The chain may be linear or branched. Typical branched heterogeneous groups have one or two branches, more typically one branch. Typically, heterogeneous groups are saturated. Unsaturated heterogeneous groups may have one or more double bonds, one or more triple bonds, or both. Typical unsaturated heterogeneous groups have one or two double bonds or one triple bond. More typically, the unsaturated heterogeneous group has one double bond.

The term "hydrocarbon group" or "hydrocarbyl group" means, for example, a chain of 1 to 25 carbon atoms, typically 1 to 12 carbon atoms, more typically 1 to 10 carbon atoms, and most typically 1 to 8 carbon atoms. Hydrocarbon groups may have a linear or branched chain structure. Typical hydrocarbon groups have one or two branches, typically one branch. The hydrocarbons may be saturated, unsaturated, conjugated, unconjugated, and combinations thereof. Typically, hydrocarbon groups are saturated. Unsaturated hydrocarbon groups may have one or more double bonds, one or more triple bonds, or combinations thereof. Typical unsaturated hydrocarbon groups have one or two double bonds or one triple bond; more typically unsaturated hydrocarbon groups have one double bond.

When the term "unsaturated" is used in conjunction with any group, the group may be fully unsaturated or partially unsaturated. However, when the term "unsaturated" is used in conjunction with a specific group defined herein, the term maintains the limitations of that specific group. For example, an unsaturated "carbocyclic group", based on the limitations of the "carbocyclic group" as defined herein, does not encompass an aromatic group.

The terms "carboxy group" or "carboxyl group", whether used alone or with other terms, such as "carboxyalkyl group", denotes —(C=O)—O— or C(O)O.

The term "carbonyl group", whether used alone or with other terms, such as "aminocarbonyl group", denotes —(C=O)— or C(O)

The terms "alkylcarbonyl group" denotes carbonyl groups which have been substituted with an alkyl group. In certain embodiments, "lower alkylcarbonyl group" has lower alkyl group as described above attached to a carbonyl group.

The term "aminoalkyl group" encompasses linear or branched alkyl groups having one to about ten carbon atoms any one of which may be substituted with one or more amino groups. In some embodiments, the aminoalkyl groups are "lower aminoalkyl" groups having one to six carbon atoms and one or more amino groups. Examples of such groups include aminomethyl, aminoethyl, aminopropyl, aminobutyl and aminohexyl.

The term "alkylaminoalkyl group" encompasses aminoalkyl groups having the nitrogen atom independently substituted with an alkyl group. In certain embodiments, the alkylaminoalkyl groups are "loweralkylaminoalkyl" groups having alkyl groups of one to six carbon atoms. In other embodiments, the lower alkylaminoalkyl groups have alkyl groups of one to three carbon atoms. Suitable alkylaminoalkyl groups may be mono or dialkyl substituted, such as N-methylaminomethyl, N, N-dimethyl-aminoethyl, N, N-diethylaminomethyl and the like.

The term "aralkyl group" encompasses aryl-substituted alkyl groups. In embodiments, the aralkyl groups are "lower aralkyl" groups having aryl groups attached to alkyl groups having one to six carbon atoms. In other embodiments, the lower aralkyl groups phenyl is attached to alkyl portions having one to three carbon atoms. Examples of such groups include benzyl, diphenylmethyl and phenylethyl. The aryl in said aralkyl may be additionally substituted with halo, alkyl, alkoxy, haloalkyl and haloalkoxy.

The term "arylalkenyl group" encompasses aryl-substituted alkenyl groups. In embodiments, the arylalkenyl groups are "lower arylalkenyl" groups having aryl groups attached to alkenyl groups having two to six carbon atoms. Examples of such groups include phenylethenyl. The aryl in said arylalkenyl may be additionally substituted with halo, alkyl, alkoxy, haloalkyl and haloalkoxy.

The term "arylalkynyl group" encompasses aryl-substituted alkynyl groups. In embodiments, arylalkynyl groups are "lower arylalkynyl" groups having aryl groups attached to alkynyl groups having two to six carbon atoms. Examples of such groups include phenylethynyl. The aryl in said aralkyl may be additionally substituted with halo, alkyl, alkoxy, haloalkyl and haloalkoxy. The terms benzyl and phenylmethyl are interchangeable.

The term "alkylthio group" encompasses groups containing a linear or branched alkyl group, of one to ten carbon atoms, attached to a divalent sulfur atom. In certain embodiments, the lower alkylthio groups have one to three carbon atoms. An example of "alkylthio" is methylthio, ($CH_3S$—).

The term "alkylamino group" denotes amino groups which have been substituted with one alkyl group and with two alkyl groups, including terms "N-alkylamino" and "N,N-dialkylamino". In embodiments, alkylamino groups are "lower alkylamino" groups having one or two alkyl groups of one to six carbon atoms, attached to a nitrogen atom. In other embodiments, lower alkylamino groups have one to three carbon atoms. Suitable "alkylamino" groups may be mono or dialkylamino such as N-methylamino, N-ethylamino, N,N-dimethylamino, N,N-diethylamino and the like.

The term "arylamino group" denotes amino groups which have been substituted with one or two aryl groups, such as N-phenylamino. The "arylamino" groups may be further substituted on the aryl ring portion of the group.

The term "heteroarylamino" denotes amino groups which have been substituted with one or two heteroaryl groups, such as N-thienylamino. The "heteroarylamino" groups may be further substituted on the heteroaryl ring portion of the group.

The term "aralkylamino group" denotes amino groups which have been substituted with one or two aralkyl groups. In other embodiments, there are phenyl-$C_1$-$C_3$-alkylamino groups, such as N-benzylamino. The "aralkylamino" groups may be further substituted on the aryl ring portion of the group.

The term "alkylaminoalkylamino group" denotes alkylamino groups which have been substituted with one or two alkylamino groups. In embodiments, there are $C_1$-$C_3$-alkylamino-$C_1$-$C_3$-alkylamino groups.

The term "arylthio group" encompasses aryl groups of six to ten carbon atoms, attached to a divalent sulfur atom. An example of "arylthio" is phenylthio. The term "aralkylthio group" encompasses aralkyl groups as described above, attached to a divalent sulfur atom. In certain embodiments there are phenyl-$C_1$-$C_3$-alkylthio groups. An example of "aralkylthio" is benzylthio.

The term "aryloxy group" encompasses optionally substituted aryl groups, as defined above, attached to an oxygen atom. Examples of such groups include phenoxy.

The term "aralkoxy group" encompasses oxy-containing aralkyl groups attached through an oxygen atom to other groups. In certain embodiments, aralkoxy groups are "lower aralkoxy" groups having optionally substituted phenyl groups attached to lower alkoxy group as described above.

The term "cycloalkyl group" includes saturated carbocyclic groups. In certain embodiments, cycloalkyl groups include $C_3$-$C_6$ rings. In embodiments, there are compounds that include, cyclopentyl, cyclopropyl, and cyclohexyl.

The term "cycloalkenyl group" includes carbocyclic groups that have one or more carbon-carbon double bonds; conjugated or non-conjugated, or a combination thereof. "Cycloalkenyl" and "cycloalkyldienyl" compounds are included in the term "cycloalkenyl". In certain embodiments, cycloalkenyl groups include $C_3$-$C_6$ rings. Examples include cyclopentenyl, cyclopentadienyl, cyclohexenyl and cycloheptadienyl. The "cycloalkenyl" group may have 1 to 3 substituents such as lower alkyl, hydroxyl, halo, haloalkyl, nitro, cyano, alkoxy, lower alkylamino, and the like.

The term "suitable substituent", "substituent" or "substituted" used in conjunction with the groups described herein refers to a chemically and pharmaceutically acceptable group, i.e., a moiety that does not negate the therapeutic activity of the inventive compounds. It is understood that substituents and substitution patterns on the compounds of the invention may be selected by one of ordinary skill in the art to provide compounds that are chemically stable and that can be readily synthesized by techniques known in the art, as well as those methods set forth below. If a substituent is itself substituted with more than one group, it is understood that these multiple groups may be on the same carbon/member atom or on different carbons/member atoms, as long as a stable structure results. Illustrative examples of some suitable substituents include, cycloalkyl, heterocyclyl, hydroxyalkyl, benzyl, carbonyl, halo, haloalkyl, perfluoroalkyl, perfluoroalkoxy, alkyl, alkenyl, alkynyl, hydroxy, oxo, mercapto, alkylthio, alkoxy, aryl or heteroaryl, aryloxy or heteroaryloxy, aralkyl or heteroaralkyl, aralkoxy or heteroaralkoxy, HO—(C=O)—, amido, amino, alkyl- and dialkylamino, cyano, nitro, carbamoyl, alkylcarbonyl, alkoxycarbonyl, alkylaminocarbonyl, dialkylaminocarbonyl, arylcarbonyl, aryloxycarbonyl, alkylsulfonyl, and arylsulfonyl. Typical substituents include aromatic groups, substituted aromatic groups, hydrocarbon groups including alkyl groups such as methyl groups, substituted hydrocarbon groups such as benzyl, and heterogeneous groups including alkoxy groups such as methoxy groups.

The term "fused" means in which two or more carbons/member atoms are common to two adjoining rings, e.g., the rings are "fused rings".

The term "humectant" generally refers to at least one compound to maintain or increase water content. The term may include a hygroscopic compound(s). It can be a molecule with at least one hydrophilic group, e.g. hydroxyl groups, amino groups, carboxyl groups, esters, amides, can be encountered as well; any hydrophilic groups that are capable of forming hydrogen bonds with water. Examples of humectants include, but are not limited to, propylene glycol, glyceryl triacetate, vinyl alcohol and neoagarobiose. Others can be sugar polyols such as glycerol, sorbitol, xylitol and maltitol, polymeric polyols like polydextrose, or natural extracts like quillaia or lactic acid. Examples include, and without being limited thereto, glycols such as propylene glycol, butylene glycol, hexylene glycol, polymers thereof, such as polyethylene glycol, polypropylene glycol, polybutylene glycol, etc., alpha hydroxyl acids, such as lactic acid, glyceryl triacetate, polymeric polyols, such as polydextrose, sugar alcohols (sugar polyols) such as glycerol, sorbitol, xylitol, maltitol, etc., and a combination thereof.

In general, there is provided polymer formulations. In particular, hydrogel formulations are provided that may have extended dehydration and/or mechanical properties. Such formulations may be useful in the manufacture of biocompatible medical devices, for example, in hydrogel materials, which include non-silicone and silicone hydrogels, having desirable physical properties for use as contact lenses(s), drug delivery system(s) and/or stimulating device(s).

In certain embodiments described herein, the hydrogels used in medical devices, such as contact lens development, have used the effect of the rehydration rate and optimal water retention to provide improved hydrogel materials. In embodiments, the hydrogel materials have an optimal rate of rehydration.

In specific embodiments, the hydrogel formulations described herein include diluent(s) to improve the dehydration characteristics and mechanical properties of a hydrogel polymer formulation compared to those without diluent(s). The diluent(s) include, for example, water and hydrophilic diluent(s). The hydrophilic diluent(s) include, for example, humectants.

The addition of a diluent(s) to the hydrogel formulations described herein, in varying concentrations into hydrogel formulations may be used to control the % expansion of the hydrogels while maintaining acceptable mechanical properties. In other embodiments, low/non-expanding lens formulations can tolerate the insertion of metallic (e.g. non-expanding metallic) and/or hydrophobic components. In further embodiments, the hydrogel formulations have less than about 20% extractables; less than about 10% extractables; or less than about 5% extractables. In other embodiments, the hydrogel formulation has extended dehydration up to about 10 days when compared to a hydrogel formulation without diluent(s). The hydrogel formulation may have improved mechanical properties with modulus ranging from about 0.3 to about 0.6 MPa and tear strength ranging from about 0.05 to about 0.2 N/mm when compared to a conventional hydrogel formulation without diluent(s). In other embodiments, the hydrogel formulation, despite hydrogel expansion, is capable of maintaining mechanical properties within an acceptable level.

In one embodiment, there is provided a hydrogel polymer comprising a humectant. The humectant, for example, can improve water adsorption and/or retention capabilities compared to a hydrogel polymer without the humectant. In certain embodiments, the humectant is capable of forming pores in the hydrogel polymer. For example, the humectant is capable of forming microporous structures in the hydrogel polymer. By increasing the molecular weight and/or concentration of the humectant, pores with various sizes and shapes may be formed to allow water adsorption and/or retention.

The humectant may include hygroscopic substances. For example, it is a hydrophilic substance, whereby it includes functional groups(s) that permit hydrogen bonding with water molecules. In embodiments, the substance may have several hydrophilic groups, such as hydroxyl groups, amines, carboxyl groups, esters and combinations thereof. Examples include, and without being limited thereto, mono-alcohols (e.g. $C_1$-$C_8$ alcohols), glycols such as propylene glycol, butylene glycol, hexylene glycol, polymers thereof, such as polyethylene glycol, polypropylene glycol, polybutylene glycol, etc., alpha hydroxyl acids, such as lactic acid, glyceryl triacetate, polymeric polyols, such as polydextrose, sugar alcohols (sugar polyols) such as glycerol, sorbitol, xylitol, maltitol, etc., and a combination thereof. Any suitable biocompatible humectant may be used. The humectant may have other features such as a suitable molecular weight and/or soluble in the monomer used for making the hydrogel polymer. In typical embodiments, the humectant is non-polymerizing.

In other embodiments, polymers that contain humectants that are entrapped in the polymer network show improved water retention capability. Polymers composed mostly of pHEMA have been shown to uptake water about 35% its weight. Some attempts have been made to increase the water content and retention capability of pHEMA. The addition of more hydrophilic monomers between 10 to 70% by weight have been shown to increase water content, which may adversely affect the mechanical properties and increase the rate of dehydration. In embodiments herein, the addition of a humectant to the hydrogel polymer or during the making of the hydrogel polymer, is shown herein to increase the water adsorption and/or retention capability as the humectant contains functional groups that bind to water. The humectant can also be added as a pore creating agent to create microporous structures in the hydrogel network. A hydrophilic monomer, such as 2-hydroxyethyl methacrylate (HEMA), with added cross-linker and can be made to have less than about 50%, and typically, considerably less than 50% water. Hence, the water content in the final hydrogel polymer has two contributions, one from the water in the hydrogel portion of the microstructure, and one from the much larger macropores. Increasing the humectant molecular weight and/or molar concentration in a hydrogel formulation can create pores with various size and geometry to allow substantially higher water uptake and retention. Glycerin is one of the examples as the humectant due to its three hydroxyl groups, molecular weight, solubility in HEMA and biocompatibility. The hydrogel polymers may be non-silicone or silicone hydrogel polymers.

In another embodiment, there is provided a hydrogel polymer formed from a siloxane crosslinker. The siloxane crosslinker may improve the mechanical properties and/or dimensional stability of the hydrogel polymer compared to a hydrogel polymer without being formed from a siloxane crosslinker. In examples, low molecular weight siloxane crosslinkers are used. In certain examples, the molecular weight may be from about 200 to about 6000 g/mol. Typically, the molecular weight of the siloxane crosslinker is selected in order to maintain compatibility with other hydrophilic monomers. In certain embodiments, the siloxane crosslinker comprises 1,3-bis(3-methacryloxypropyl)tetramethyldisiloxane.

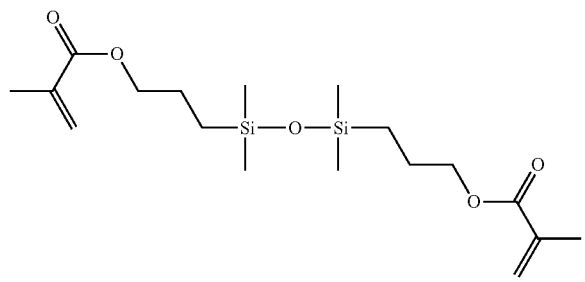 [SMILES: C=C(C)C(=O)OCCC[Si](C)(C)O[Si](C)(C)CCCOC(=O)C(=C)C]

In some embodiments, the properties of a siloxane crosslinker include low rotation barriers, in particular, the functional groups may have low rotation barriers such as less than 5 kJ/mol. In additional embodiments, the rotation energy around a $CH_2$—$CH_2$ bond in polyethylene is 13.8 kJ/mol but about 3.3 kJ/mol around a $Me_2Si$—O bond, corresponding to a nearly free rotation. In embodiments, the siloxane crosslinker includes an $(alkyl)_2Si$—O bond. Other examples of properties of a siloxane crosslinker include low chain-to-chain interaction due to the low cohesive energy, and the distance between the adjacent chains is larger in silicones compared to alkanes, which also contributes to better flexibility.

The siloxane crosslinker may improve the modulus and elasticity of hydrophilic hydrogel polymers having a water content greater than about 50%. It is known to those skilled in the art that the incorporation of a conventional crosslinker such as ethylene glycol dimethacrylate (EGDMA) results in a confined polymer network that becomes fragile when water content values exceed 50% (e.g. a reduction in modulus and have a tendency to tear). Examples of the resulting hydrogels formed from the siloxane crosslinker show an improved modulus and elasticity of hydrophilic hydrogel systems with water content greater than 50%.

Many silicone hydrogels may possess relatively high moduli (Young's modulus of elasticity), such as greater than about 2 MPa as measured by ASTM test method D1938. For many biomedical applications, hydrogel polymers may have reduced moduli, e.g. about 0.3 MPa to about 0.6 MPa. This is typical in the hydrogel formation of soft contact lenses and other biomedical materials for example, as the modulus of lens or biomaterial can have an impact upon the end use of the material. The use of silicone monomers such as bulky siloxanylalkyl methacrylates, which includes methyl di(t-rimethylsiloxy) silylpropylglyceryl methacrylate (SIGMA), are known to reduce the modulus of one class of silicone hydrogels, i.e. polyurethane-polysiloxane hydrogel compositions. SIGMA also contains a hydroxyl group that can bind to water and form a desirable material that provides increased compatibility as between silicone-containing and hydrophilic monomeric units.

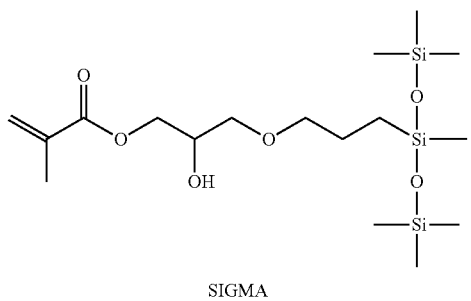 [SMILES: C=C(C)C(=O)OCC(O)COCCC[Si](C)(O[Si](C)(C)C)O[Si](C)(C)C]

SIGMA

In the various embodiments described above, the hydrogel polymer may be formed/prepared from a siloxane crosslinker and contain a humectant. Moreover, these hydrogel polymers may be formed/prepared from a silicone monomer. The silicone monomer may be selected from siloxanylalkyl methacrylates. The siloxane crosslinker may be selected from 1,3-bis(3-methacryloxypropyl)tetramethyldisiloxane.

In the various embodiments described above, the hydrogel polymer may be formed/prepared from a siloxane crosslinker and a silicone monomer. The silicone monomer may be selected from siloxanylalkyl methacrylates. The siloxane crosslinker may be selected from 1,3-bis(3-methacryloxypropyl)tetramethyldisiloxane. In addition, the hydrogel polymer may further contain a humectant.

With respect to the various embodiments described above, there is provided a hydrogel polymer prepared from the composition described herein. In other aspects, wherein the polymer possesses a water content of at least about 40% by weight, at least about 45% by weight, at least about 50% by weight, at least about 65% by weight, at least about 70% by weight, at least about 71% by weight, at least about 77% by weight, or at least about 90% by weight. In further aspects, wherein the polymer possesses a modulus of elasticity of at least about 0.30 MPa, at least about 0.35 MPa, at least about 0.40 MPa, or at least about 0.45 MPa.

In other embodiments described herein, there is provided a contact lens prepared with the hydrogel polymer described herein.

In embodiments, the hydrogel materials may have advantageous electrical conductivity for an extended period of time. For example, from from about one day to about seventeen days.

The embodiments described herein can be used to make hydrogel material(s), which includes, and without being limited thereto, silicon hydrogel materials. Such materials/compositions are useful in the manufacture of biocompatible medical devices, for example, having desirable physical properties for use as contact lense(s) and/or stimulating device(s).

If present, the (meth)acrylate cross-linking agent(s) can be used in an effective amount to balance the requirement of a structural hydrogel framework with the water content or the inherent wettability of the resulting hydrogel material. The (meth)acrylate cross-linking agent can be present in the composition from 0.1% to 3% by weight, from about 0.2% to about 1% by weight, or from 0.2% to 0.6% by weight.

In general embodiments, to achieve a hydrogel material that includes a proper balance of desired properties, particularly, if the hydrogel material is to be a material for a contact lens, a stable hydrogel polymer framework is typically balanced with the wettability and lubricity of the hydrogel surface in a physiological aqueous environment. Accordingly, the amount of (meth)acrylate cross-linking agent may exceed the amount of cross-linking agent(s) and a hydrogel material with the desired balance of properties can be formed. Accordingly, in one compositional embodiment, the (meth)acrylate cross-linking agent(s) is present in an amount that exceeds the amount of cross-linking agent by at least 2×, typically at least 3×, up to about 10×, in terms of percent by weight in the composition. Alternatively, in terms of a weight ratio of (meth)acrylate cross-linking agent to cross-linking agent(s), the weight ratio may be from 2:1 to 10:1, typically from 2:1 to 6:1.

Furthermore, the ratio of hydrophobic co-monomer to hydrophilic co-monomer present in a monomer formulation in preparing the N-vinyl lactam, can be varied as desired to obtain the particular combination of polymer properties desired for the particular application. The typical amount of N-vinyl lactam in the polymer composition is about 70 to about 90 percent by weight to achieve a relatively high water content of about 70% to about 90% by weight.

Water content is measured by individually placing the lens on a piece of premoistened Whatman #1 filter paper. The surface moisture is removed by lightly smoothing a second piece of premoistened Whatman #1 filter paper over the lens. After checking the accuracy of the balance with two known weights, the lens is placed in a tared weigh boat. The wet weight is recorded to the nearest 0.1 mg and the lens transferred to the lens holder, concave side up (this allows the lens identity to be maintained to match wet and dry weights). After the lens holders are full, they are placed on a spindle with a plastic spacer between them and placed in a glass jar approximately ½ full of desiccant. The jar is capped and the lid tightened, then loosened slightly to prevent pressure buildup. The jar with lenses is placed in a 500-650 watt microwave oven along with a 400 ml beaker containing at least 200 ml of distilled water with boiling beads to keep the jar from becoming overheated. The jar is microwaved at 500-650 watts for 10 minutes; the start time and date are recorded on the paperwork. When the cycle finishes, the jar is removed from the microwave and allowed to cool on the bench for 30 minutes; time out and date are also recorded. When cool, the lenses are individually weighed and their dry weights recorded to the nearest 0.1 mg, matching the dry weights to the corresponding wet weight. The water content is expressed as % water according to the following formula: Water Content is [(wet weight−dry weight)/wet weight]×100.

(Meth)acrylate monomers polymerize very rapidly while the at least one vinyl monomer, polymerizes relatively slowly and fail to effectively copolymerize resulting in a high level of uncrosslinked poly(NVP), the latter of which can be released from the hydrogel resulting in a loss of dimensional stability and a loss of surface wettability. The dual-reactive cross-linking agent(s) described in International Patent Application No. PCT/CA2017/050933, and incorporated by reference, can allow one to control the amount of cross-linking of the formed poly(NVP) with the hydrogel network, and in particular the cross-linking with the (meth)acrylate polymers of the network. The control of crosslink density can affect the wettability, lubricity, tear strength, extractables and dimensional stability of the resulting hydrogel material. Due to the dual-reactive sites of the described cross-linking agent(s), the agents can form a crosslink between the essentially (meth)acrylate homopolymer and the essentially vinyl homopolymer resulting in hydrogel materials that possess low extractables and excellent dimensional stability.

A hydrogel film prepared with at least 70% by weight of N-vinyl lactam monomer, and a cross-linking agent(s) may possess a tear strength of at least about 0.06 N/mm, at least about 0.07 N/mm, or at least about 0.08 N/mm. The hydrogel film may also possess a water content of at least about 40% by weight, at least about 45% by weight, at least about 50% by weight, at least about 65% by weight, at least about 70% by weight, at least about 71% by weight, at least about 77% by weight, or at least about 80% by weight. The hydrogel film may also possess a modulus of elasticity of at least about 0.30 MPa, at least about 0.35 MPa, at least about 0.40 MPa, or at least about 0.45 MPa.

A typical hydrogel film like a contact lens can possess the following mechanical properties: a tear strength of at least about 0.06 N/mm; a water content of at least about 45% by weight; and a modulus of elasticity of at least about 0.30 MPa.

Another typical hydrogel films like a contact lens can possess the following mechanical properties: a tear strength of at least about 0.07 N/mm; a water content of at least about 50% by weight; and a modulus of elasticity of at least about 0.40 MPa.

Another typical hydrogel film like a contact lens can possess the following mechanical properties: a tear strength of at least about 0.08 N/mm; a water content of at least about 65% by weight; and a modulus of elasticity of at least about 0.45 MPa.

The resulting hydrogel materials may possess a highly wettable hydrogel "surface" enriched with the slow reacting monomer/polymer component. The dual reactivity approach can also allow for the surface enrichment, or exposure, of chemical functionality capable of providing for improved clinical performance. This functionality can be bioinspired in nature. For example, the addition of a monomer with vinyl carbonate phosphadityl choline, which copolymerizes well with NVP, will result in a phosphadityl choline enriched lens surface. Hydrogel materials with this surface functionality may exhibit such characteristics as a low affinity for proteins, lipids, and bacteria. In addition, the use of bioinspired fast reacting methacrylate based monomer combined with a silicone based monomer can provide for improved wetting and compatibility with the PVP reacting phase.

In an embodiment, a contact lens is prepared with the hydrogel polymer described herein. In embodiments, when the contact lens is placed in a saline solution, the contact lens has low expansion. For example, the contact lens has less than about 6% expansion; has about 2% to about 6% expansion; has less than about 5% expansion; has less than about 4% expansion; has less than about 3% expansion; has less than about 2% expansion; or has zero expansion. In another embodiment, the contact lens is capable of accommodating a further component without affecting at least one property of the lens. The property may be the shape and optics of the lens. The contact lens may be capable of accommodating a further component without substantially distorting at least one of the shape and optics. The contact lens may be capable of accommodating a further component without collapsing the lens. In embodiments, the further component is at least one sheet. The at least one sheet comprises at least one metal and/or at least one polymer. In another embodiment, the at least one sheet comprises said at least one metal. In another embodiment, the at least one sheet comprises said at least one polymer. In another embodiment, the at least one sheet is selected from metal, polyethylene, polypropylene, and/or polysiloxane sheets. The at least one sheet is about 1 to about 50 microns thick. To make the contact lens with the further component, the further component may be, for example, placed between discs/lens of the hydrogel material described herein (see examples provided).

The chemistry of hydrogels is well known and there exists a variety of monomers that can be used to make the hydrogel materials. In particular, monomers of interest to the contact lens art include, for example, acrylate, acrylamide, methacrylate, methacrylamide, styrene-containing monomers, dimethacrylate and dimethacrylamide monomers, vinyl amide-containing monomers, vinyl carbonate/carbamate/urea monomers, and (meth)acrylate/(meth) acrylamide-capped prepolymers. All of the above-mentioned monomers and prepolymers may further include polysiloxanes and polyfluorosiloxanes, such as ethylenically terminated methacrylate capped urethane-containing polysiloxane prepolymers, fluorine containing polysiloxanes, polyether containing siloxanes, and polysiloxanes monomers, such as, α,ω-bis(methacryloxybutyl) polysiloxane ($M_2$ D25).

Suitable monomers may be represented by the general formulae:

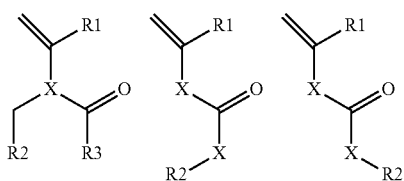

wherein X is O or $NR^c$, where $R^c$ is hydrogen, $C_1$-$C_4$ alkyl or $C_1$-$C_3$ alkanol; R1 is H or $CH_3$; and R2 and R3 are independently hydrogen, a $C_1$-$C_{18}$ alkyl, $C_3$-$C_{18}$ cycloalkyl, $C_3$-$C_{18}$ cycloalkylalkyl, $C_3$-$C_{18}$ cycloalkenyl, $C_5$-$C_{30}$ aryl, $C_5$-$C_{30}$ arylalkyl, $C_1$-$C_{18}$ alkyl siloxysilane or $C_1$-$C_{18}$ alkyl siloxane, each of which can be optionally substituted, linear or branched, or R2 and R3 together with the nitrogen atom to which they are bonded are joined together to form a heterocyclic group.

The compositions can also include other hydrophilic monomers that are well known in the contact lens art, and include, but not limited to, 2-hydroxyethyl methacrylate (HEMA), glyceryl monomethacrylate (GM) and 2-acrylamido-2-methyl propane sulfonic acid (AMPS). Examples of other hydrophilic monomers useful for polymerization with the vinyl monomer include, but are not limited to, unsaturated carboxylic acids, e.g., acrylic acids, methacrylic acids and the like; (meth)acrylic substituted alcohols, e.g., 3-hydroxypropyl methacrylate, 3-hydroxypropyl acrylate and the like, or combinations thereof. Still other hydrophilic monomers include the azetidinium and the oxazolone-based monomers disclosed in U.S. Pat. No. 4,910,277.

As noted, the additional hydrophilic monomer may be typically (meth)acrylate monomer, and therefore, will typically copolymerize with other (meth)acrylate monomer in the composition with a similar free-radical rate of reactivity. Hydrophilic monomer with hydroxyl functionality is of interest because the hydroxyl functionality can provide additional surface wettability of the resulting hydrogel material. A particular monomer of interest is 2-hydroxyl ethyl methacrylate, which can be present in the composition from 5% to 30% by weight. In a typical composition, the N-vinyl-2-pyrrolidone is present from 30% to 90% by weight, and the 2-hydroxyl ethyl methacrylate is present from 0.5% to 30% by weight.

In the absence of any one silicone-containing monomer, the hydrogels formed are referred to in the art as conventional hydrogels. However, silicone hydrogels is another class of hydrogel materials of importance in the field of medical devices. Accordingly, one or more silicone-containing monomers can be included in a composition of interest. Some well-known silicone-containing monomers include the TRIS-like and trisiloxane (siloxy silane) monomers represented by the following structures.

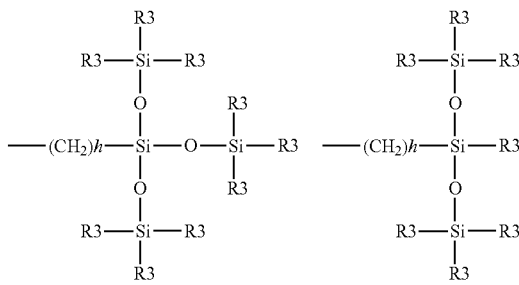

wherein h is 1 to 18 and each R3 independently denotes a lower alkyl radical, or phenyl radical. Representative examples of such acrylate ester and/or methacrylate ester-containing monomers include 3-methacryloyloxypropyltris (trimethylsiloxy)silane or (3-methacryloxy-2-hydroxypropyloxy)propylbis(trimethylsiloxy)-methylsilane), sometimes referred to as TRIS and SIGMA, respectively, and are commercially available from such sources as Gelest, Inc. (Morrisville, PA). Other examples of siloxy silanes include, pentamethyldisiloxanyl methylmethacrylate, phenyltetramethyl-disiloxanylethyl acrylate, methyldi(trimethylsiloxy) methacryloxymethyl silane, 3-[tris(trimethylsiloxy)silyl]propyl vinyl carbamate, 3[tris(trimethylsiloxy) silyl]propyol allyl carbamate, 3-tris(trimethylsiloxy)silyl] propyl vinyl carbonate, or combinations thereof. Additional examples of typical siloxy silanes include N-[tris(trimethylsiloxy)silylpropyl]-methacrylamide, N-[tris(dimethylpropyl-siloxy)silylpropyl]methacrylamide, N-[tris(dimethylphenylsiloxy)-silyl propyl](meth)acrylamide, N-[tris (dimethylethylsiloxy)silylpropyl](meth)acrylamide, N-(2-hydroxy-3-(3-(bis(trimethylsilyloxy)methylsilyl)propyloxy) propyl)-2-methyl acrylamide, N-(2-hydroxy-3-(3-(bis (trimethyl-silyloxy)methylsilyl)propyloxy)propyl) acrylamide, N,N-bis[2-hydroxy-3-(3-(bis(trimethylsilyloxy) methylsilyl)propyloxy) propyl]-2-methyl acrylamide, N,N-bis[2-hydroxy-3-(3-(bis(trimethylsilyloxy)methylsilyl)propyloxy)propyl]acrylamide, N-(2-hydroxy-3-(3-(tris(trimethylsilyloxy) silyl)-propyloxy)propyl)-2-methyl acrylamide, N-(2-hydroxy-3-(3-(tris(trimethylsilyloxy)silyl)propyloxy)-propyl)acrylamide, N,N-bis[2-hydroxy-3-(3-(tris(trimethylsilyloxy)silyl)propyloxy)propyl]-2-methyl acrylamide, N,N-bis[2-hydroxy-3-(3-(tris(trimethylsilyloxy)silyl) propyloxy)propyl]acrylamide, N-[2-hydroxy-3-(3-(t-butyldimethylsilyl) propyloxy)propyl]-2-methyl acrylamide, N-[2-hydroxy-3-(3-(t-butyldimethylsilyl)propyloxy)propyl] acrylamide, N,N-bis[2-hydroxy-3-(3-(t-butyldimethylsilyl)-propyloxy)propyl]-2-methyl acrylamide, N,N-bis[2-hydroxy-3-(3-(t-butyldimethylsilyl)propyloxy)-propyl] acrylamide, 3-methacryloxy propylpentamethyl disiloxane, 3-methacryloxy-2-(2-hydroxy ethoxy)-propyloxy)propylbis (trimethylsiloxy)methylsilane, N-2-methacryloxyethyl-O-(methyl-bis-trimethylsiloxy-3-propyl) silyl carbamate, 3-(trimethylsilyl)-propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl]propyl allyl carbamate, 3-[tris(trimethylsiloxy) silyl]propyl vinyl carbonate, t-butyldimethyl-siloxyethyl vinyl carbonate, trimethylsilylethyl vinyl carbonate, tri methylsilylmethyl vinyl carbonate, or combinations thereof.

Silicone monomers referred in the art as silicone monofunctional monomer can also be included in the described compostions. See, U.S. Pat. No. 8,937,110 to Vanderlaan. Examples of some silicone monofunctional monomer include monomethacryloxyalkyl-polydimethylsiloxane methacrylates selected from monomethacryloxypropyl terminated mono-n-butyl terminated polydimethylsiloxane, monomethacryloxypropyl terminated mono-n-methyl terminated polydimethylsiloxane, monomethacryloxypropyl terminated mono-n-butyl terminated polydiethylsiloxane, monomethacryloxypropyl terminated mono-n-methyl terminated polydiethylsiloxane, N-(2,3-dihydroxypropane)-N'-(propyl tetra(dimethylsiloxy)dimethylbutylsilane) acrylamide, α-(2-hydroxy-1-methacryloxypropyloxypropyl)-o-butyl-decamethyl-pentasiloxane, or combinations thereof.

In another embodiment, the silicone monofunctional monomer is selected from monomethacryloxypropyl terminated mono-n-butyl terminated polydimethylsiloxane, monomethacryloxypropyl terminated mono-n-methyl terminated polydimethylsiloxane, N-(2,3-dihydroxypropane)-N'-(propyl tetra(dimethylsiloxy)dimethylbutylsilane)acrylamide, α-(2-hydroxy-1-methacryloxypropyloxypropyl)-o-butyl-decamethyl-Ipentasiloxane, or combinations thereof.

In another embodiment the silicone monofunctional monomer is selected from acrylamide silicones general formulae (s1) through (s6) below.

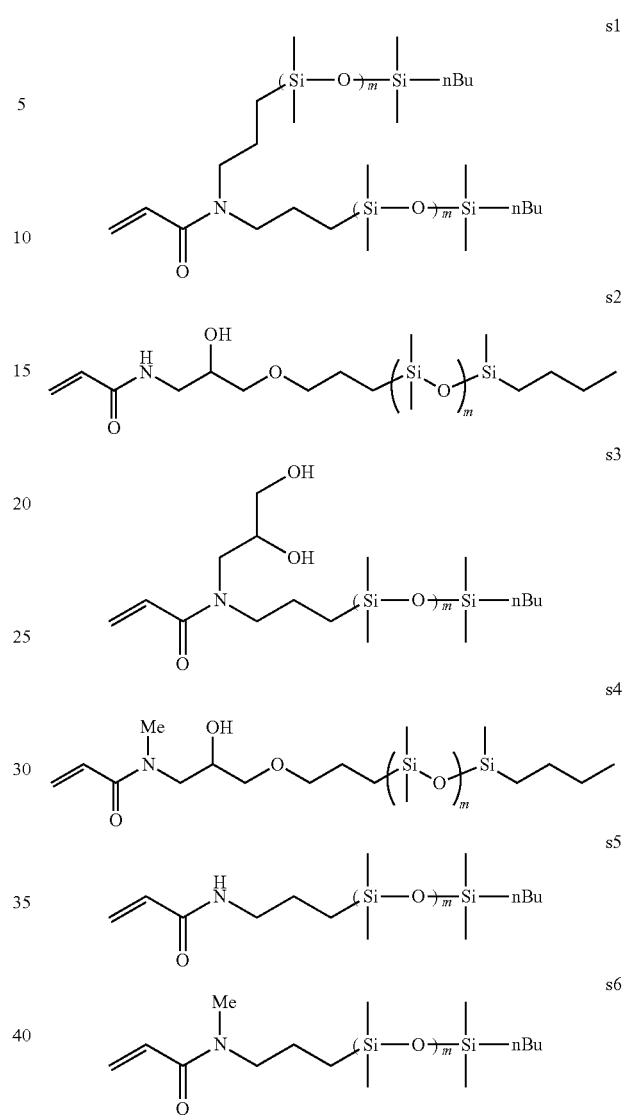

The at least one silicone-containing monomer is present in the described compositions in an amount sufficient to provide the desired oxygen permeability. In certain embodiments, oxygen permeabilities can be greater than about 60 barrers, greater than about 80 barrer, or in some other embodiments greater than about 90 barrer. Suitable amounts will depend on the length of the siloxane chain included in the silicone-containing monomers, with silicone-containing monomers having longer chains requiring less monomer. Amounts include from about 20% to about 60% by weight, and in some embodiments from about 30% to about 55% by weight.

In certain silicone hydrogel compositions, one or more of the silicone-containing monomer above are present in a composition from about 25% to about 80% by weight, or from about 20% to about 80% by weight. In a typical composition, the N-vinyl-2-pyrrolidone is present from about 50% to about 90% by weight, 2-hydroxyl ethyl methacrylate is present from about 0.5% to about 25% by weight, and the silicone-containing monomer is present from about 30% to about 70% by weight.

Specific bioinspired monomers include, but not limited to, carboxybetaines, sulfobetains and phosphobetaines, such as methacryloxy phosphatidyl choline (MPC), N-vinylcarboxy ethyl phosphatidyl choline, 0-vinyl ethyl phosphatidyl choline carbonate, 1-(3-sulfopropyl)-2-vinylpyridinium betaine, 3-dimethyl(acryloyloxyethyl) ammonium propyl sulfonate, functional sugars and proteins, or any one mixture of bio-inspired monomer. Other suitable bioinspired hydrophilic monomers will be apparent to one skilled in the art. The bioinspired monomer is present from about 0.5% to about 16% by weight or from about 2% to about 6% by weight.

Useful hydrophobic monomers for use herein include, but are not limited to, alkyl acrylates and methacrylates, 4-t-butyl-2-hydroxy cyclohexyl methacrylate (TBE), tert-butyl cyclohexyl methacrylate, isopropylcyclopentyl acrylate, tert-butylcyclohexyl acrylate, isobornyl methacrylate and the like; 2-ethylhexyl methacrylate, 2-phenyloxyethyl methacrylate, partially fluorinated acrylates, partially fluorinated methacrylates and the like, or combinations thereof.

In general, the copolymerization reaction can be conducted neat or with a suitable co-solvent. The monomeric mixture and optional cross-linking agent(s) are combined in the desired ratio, and then exposed to, for example, ultraviolet (UV) light or electron beams in the presence of one or more photoinitiator(s) or at a suitable temperature, for a time period sufficient to form the copolymer. Heat may also be employed to initiate the polymerization in which case a series of Vazo, peroxide or peroxy initiators, well-known in the art, may be used. Suitable reaction times will ordinarily range from about 1 minute to about 24 hours and typically from about 1 hour to about 10 hours.

The use of UV or visible light in combination with photoinitiators is well known in the art and is particularly suitable for formation of the copolymer. Numerous photoinitiators of the type in question here are commercial products. Photoinitiators enhance the rapidity of the curing process when the photo curable compositions as a whole are exposed to, for example, ultraviolet radiation. Suitable photoinitiators which are useful for polymerizing the polymerizable mixture of monomers can be commercially available photo initiators. They are generally compounds which are capable of initiating the radical reaction of olefinically unsaturated double bonds on exposure to light with a wavelength of, for example, about 260 to about 480 nm.

Examples of suitable photoinitiators for use herein include, but are not limited to, one or more photoinitiators commercially available under the "IRGACURE", "DAROCUR" and "SPEEDCURE" trade names (manufactures by Ciba Specialty Chemicals, also obtainable under a different name from BASF, Fratelli Lamberti and Kawaguchi), e.g., "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl) phosphine oxide and 2-hydroxy-2-methyl-1-phenyl-propan-1-one), and 819 [bis(2,4,6-trimethyl benzoyl)phenyl phosphine oxide] and "DAROCUR" 1173 (2-hydroxy-2-methyl-1-phenyl-1-propan-1-one) and 4265 (the combination of 2,4,6-trimethylbenzoyldiphenyl-phosphine oxide and 2-hydroxy-2-methyl-1-phenyl-propan-1-one); and the like and mixtures thereof. Other suitable photo initiators for use herein include, but are not limited to, diphenyl(2,4,6-trimethylbenzoyl)phosphine oxide (TPO) and ethyl(2,4,6-trimethylbenzoyl)phenylphosphinate (TPO-L), alkyl pyruvates such as methyl, ethyl, propyl, and butyl pyruvates, and aryl pyruvates such as phenyl, benzyl, and appropriately substituted derivatives thereof. Generally, the amount of photo initiator can range from about 0.05% w/w to about 5% w/w and typically from about 0.1% w/w to about 1% w/w.

Examples of suitable thermal initiators for use herein include, but are not limited to, include the azo and peroxy type compounds, such as 2,2-azobisisobutyronitrile (VAZO 64) (AIBN), 4,4-azobis(4-cyanovaleric acid), 1,1-azobis(cyclohexanecarbonitrile), benzoyl peroxide, 1,1-bis(tert-butylperoxy)cyclohexane, tert-butyl hydroperoxide, tert-butyl peroxybenzoate and dicumyl peroxide. Generally, the amount of thermal initiator can range from about 0.05% w/w to about 5% w/w and typically from about 0.1% w/w to about 1% w/w.

An organic diluent (solvent) can be included in any one composition of interest. As used herein, the term "organic diluent" encompasses organic compounds which minimize incompatibility of the components in the initial monomeric mixture and are substantially nonreactive with the components in the initial mixture. Additionally, the organic diluent serves to minimize phase separation of polymerized products produced by polymerization of the monomeric mixture. Also, the organic diluent will generally be relatively non-flammable. Contemplated organic diluents include alcohols such as tert-butanol (TBA), tert-amyl alcohol, diols, such as ethylene glycol; and polyols, such as glycerol. Typically, the organic diluent is water soluble and can be removed easily through a water extraction process. Other suitable organic diluents would be apparent to a person of ordinary skill in the art.

The organic diluent is included in an amount effective to provide the desired effect (for example, minimal phase separation of polymerized products). Generally, the diluent is included at 0 to 60% by weight of the monomeric mixture, with about 1% to about 40% by weight being more typical, about 2% to about 30% by weight being even more typical and about 3% to about 25% by weight being especially typical.

The compositions described can also include at least one UV absorbing compound. Surprisingly, UV absorbing compounds can have a substantially different impact on the reaction kinetics of the reactive components in the reaction mixtures of the present invention. For example, it has been found that benzotriazoles substantially slow the rate of reaction for NVP and TEGDMA is some systems much more than the reaction rates of the silicone-containing components. In the case of NVP, this can be beneficial, as it can provide additional processing flexibility and an exceptional balance of properties, including water contents in excess of about 60%, haze values less than about 50%, or less than about 10%, advancing contact angles less than about 60° and Dk's greater than about 80.

When the silicone hydrogel is used as an ophthalmic device it may be desirable to incorporate a reactive UV absorbing compound in the reaction mixture so that the resulting silicone hydrogel will be UV absorbing. However, in another embodiment non-reactive UV absorbing compounds may be used solely to achieve the desired reaction kinetics. Alternatively, solution filters may be used. It is believed that the UV absorbers in the reactive mixtures block incident light below about 370 nm which alters the spectrum of light being imposed on the visible photoinitiator. This tends to reduce the rate of initiation as well as lower the concentration of initiator radicals present, which in turn is believed to have a significant impact on the rate of polymerization of the monomers. Typically, the monomers which are likely to be most significantly impacted are the slowest and fastest. In several of the examples included herein, NVP (slowest) and TEGDMA (the fastest) are the most sensitive to the presence of the UV absorber.

Suitable UV absorbers may be derived from 2-(2'-hydroxyphenyl)benzotriazoles, 2-hydroxybenzophenones, 2-hydroxyphenyltriazines, oxanilides, cyanoacrylates, salicylates and 4-hydroxybenzoates; which may be further reacted to incorporate reactive polymerizable groups, such as (meth)acrylates. Specific examples of UV absorbers which include polymerizable groups include 2-(2'-hydroxy-5-methacryloyloxyethylphenyl)-2H-benzotriazole (Norbloc), 5-vinyl and 5-isopropenyl derivatives of 2-(2,4-dihydroxyphenyl)-2H-benzotriazole and 4-acrylates or 4-methacrylates of 2-(2,4-dihydroxyphenyl)-2H-benzotriazole or 2-(2,4-dihydroxyphenyl)-1,3-2H-dibenzotriazole, mixtures thereof and the like. When a UV absorber is included, it may be included in amounts between about 0.5% and about 4% by weight, and suitably between about 1% and about 2% by weight.

The present invention relates to monomeric formulations useful in the manufacture of biocompatible medical devices. More particularly, the present invention relates to hydrogel formulations capable of polymerization to form polymeric compositions having desirable physical properties useful in the manufacture of contact lenses. Such properties may include low modulus of elasticity, a high level of oxygen permeability, wettability, lubricity and a low level of extractables.

According to the present process, the non-silicone and silicon containing monomeric mixture, comprising at least one hydrophilic monomer, and an optionally the organic diluent, is shaped and cured by conventional methods such as static casting or spincasting. The cross-linking agent(s) is useful for a wide variety of polymeric materials, either rigid or soft. Especially typical polymeric materials are lenses including contact lenses, phakic and aphakic intraocular lenses and corneal implants although all polymeric materials including biomaterials are contemplated as being within the scope of this invention. Typical articles are optically clear and useful as a contact lens.

Hydrogel formation can be by free radical polymerization such as azobisisobutyronitrile (AIBN) and peroxide catalysts using initiators and under conditions such as those set forth in U.S. Pat. No. 3,808,179, incorporated herein by reference. Photoinitiation of polymerization of the monomer mixture as is well known in the art may also be used in the process of forming an article as disclosed herein. Following hydration, the shaped article, for example a lens for custom optics lens, is optionally machined by various processes known in the art. The machining step includes lathe cutting a lens surface, lathe cutting a lens edge, buffing a lens edge or polishing a lens edge or surface. The present process is particularly advantageous for processes wherein a lens surface is lathe cut, since machining of a lens surface is especially difficult when the surface is tacky or rubbery. The described hydrogel materials can also be prepared by film casting.

The examples should not be read as limiting the scope of the invention as defined in the claims. Unless clearly stated otherwise all numerical percentages, e.g., percentage amounts of monomer in a polymerization mixture, are listed as weight percent, supra.

The compositions described herein can be used to make hydrogel materials for a biomedical device such as artificial heart valves, films, surgical devices, vessel substitutes, intrauterine devices, membranes, diaphragms, surgical implants, artificial blood vessels, artificial ureters, artificial breast tissue and membranes intended to come into contact with body fluid outside of the body, e.g., membranes for kidney dialysis and heart/lung machines and the like, catheters, mouth guards, denture liners, ophthalmic devices, and especially hydrogel contact lenses.

As used herein, a "biomedical device" is any article that is designed to be used while either in or on mammalian tissues or fluid, and in one embodiment in or on human tissue or fluids. Examples of these devices include but are not limited to catheters, implants, stents, and ophthalmic devices such as intraocular lenses, stimulating devices, ultra sounds, punctal plugs and contact lenses.

The transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

For the purposes of this specification and appended claims, unless otherwise indicated, all numbers expressing quantities, percentages or proportions, and other numerical values used in the specification and claims, are to be understood as being modified in all instances by the term "about." Furthermore, all ranges disclosed herein are inclusive of the endpoints and are independently combinable. Whenever a numerical range with a lower limit and an upper limit are disclosed, any number falling within the range is also specifically disclosed.

Any term, abbreviation or shorthand not defined is understood to have the ordinary meaning used by a person skilled in the art at the time the application is filed. The singular forms "a," "an," and "the," include plural references unless expressly and unequivocally limited to one instance.

EXAMPLES

All monomer components (both silicone and hydrophilic monomers) were purified before use. Hydrogel films were prepared by taking about 10 grams of any one of the formulations 3A-3H (see below) and placing the formulation into a dark vial in a low humidity glove box (<80 ppm Oxygen, <5% RH). The formulation was purged with nitrogen at a flow rate of about 0.4 L/min for about 10 minutes. About 100 uL of the formulation was placed into a polypropylene mold, designed to give circular disks/lenses in dimensions outlined in Table 1. The formulation was cured for 15 minutes using a 405 nm LED lamp. The resultant hydrogel film was removed from the mold and place in hydrating media as outlined in Table 2. The hydrogel film was hydrated for a specified time and expansion, opacity, formulation compatibility, % extractables, contact angle and % dehydration was measured.

Example 1: Mold Design Dimensions

TABLE 1

|  | A | B | C | D | E | F | G | H |
|---|---|---|---|---|---|---|---|---|
| Diameter (mm) | 14.5 | 14.5 | 14.5 | 14.5 | 14.5 | 14.5 | — | — |
| Thickness (mm) | 0.05 | 0.1 | 0.15 | 0.2 | 0.25 | 0.3 | 0.1 | 0.3 |
| Basecurve (mm) | 8.5 | 8.5 | 8.5 | 8.5 | 8.5 | 8.5 | — | — |
| Width (mm) | — | — | — | — | — | — | 10 | 10 |
| Length (mm) | — | — | — | — | — | — | 10 | 10 |

Mold designs with varying dimensions were used to fabricate hydrogel disks/lenses. The Diameter and basecurve of the mold were held constant for design A to F while varying the thicknesss between about 0.05 to about 0.3 mm. The length and width for design G and H were held constant to make rectangular shaped hydrogels while varying the thicknesss between about 0.1 to about 0.3 mm Example 2. Hydrogel Hydrating Media

TABLE 2

| Material | 2A | 2B | 2C | 2D | 2E |
|---|---|---|---|---|---|
| PG | 30 | 30 | 30 | 30 | 0 |
| NaCl | 8 | 12 | 15 | 20 | 0.9 |
| water | 62 | 58 | 55 | 50 | 99.1 |

The fabricated hydrogels were placed in varying hydrating media as described in Table 2. The propylene glycol (PG) content was held constant while varying the sodium chloride and water content. Sodium chloride was first dissolved in water under strring. The PG was than added slowly to ensure complete dissolution.

Example 2a. LED Lamp Intensity Output

TABLE 3

|  | A | B | C | D | E | F |
|---|---|---|---|---|---|---|
| Lamp Intensity (mW) | 4.5 | 5 | 5.5 | 6 | 6.5 | 7 |

A 405 nm LED lamp was used with the varying output intensities. A radiometer was used to confirm output values.

Example 3. Hydrogel Formulations 3A and 3B

Hydrogel disks/lenses were prepared from each formulation: Examples 3A and 3B. The hydrogel disks/lenses were prepared from a monomer formulation that includes 2-hydroxyethyl methacrylate (HEMA), 1,3-bis(3-methacryloxypropyl)tetramethyldisiloxane (Si-Cross), methyl di(trimethylsiloxy) silylpropylglyceryl methacrylate (SIGMA), glycerin (1,2,3-propanetriol), and diphenyl(2,4,6-trimethylbenzoyl)phosphine oxide (TPO).

TABLE 4

| Components | 3A (wt %) | 3B (wt %) |
|---|---|---|
| HEMA | 61.1 | 61.1 |
| SI-Cross | 0.4 | 0.4 |
| SIGMA | 2 | 3 |
| GLYCERIN | 36.1 | 35.1 |
| TPO | 0.4 | 0.4 |
| TOTAL | 100 | 100 |

The monomer formulation mixture was mixed well using a magnetic stirrer and then degassed for about 10 minutes using a dry nitrogen stream. The mixed formulation was added to unpurged polypropylene molds, and the filled molds were placed in an UV chamber for 15 minutes. The lenses were removed from the UV-chamber and allowed to cool to room temperature. The lenses were dry released from the molds. Alternatively, the lenses can be wet released from the mold. Dry release or wet release methods are well known to those of ordinary skill in the contact lens art.

Formulations outlined in Table 4 yielded clear and miscible solutions. The resulting polymer disks/lenses were visually inspected for haze and physical structure under a microscope. An optical grid was used to determine surface damage/fragmentations that may have occurred during the demolding process. The disks/lenses in the dry state were measured using an optimec to determine whether shrinkage occurred.

The resulting disks/lenses were then placed in hydrating media: 2A, 2B, 2C and 2D (Table 2) to evaluate % water content, hydrogel expansion at 24 hour intervals for 10 days (using optimec) and % dehydration at 25° C. and 55% RH (relative humidity) at 24 h intervals for 9 days (using optimec). Data is shown in Tables 5-7.

TABLE 5

|  | Hydrogel % Expansion in Hydrating Media 2A | |
|---|---|---|
| Hydration days | 3A | 3B |
| 1 | 10 | 15 |
| 2 | 20 | 20 |
| 3 | 30 | 25 |
| 4 | 50 | 30 |
| 5 | 65 | 55 |
| 6 | 68 | 63 |
| 7 | 70 | 67 |
| 8 | 71 | 70 |
| 9 | 71 | 70 |
| 10 | 72 | 71 |

TABLE 6

|  | Hydrating media | | | | | | | |
|---|---|---|---|---|---|---|---|---|
|  | 2A | | 2B | | 2C | | 2D | |
| Formulation | 3A | 3B | 3A | 3B | 3A | 3B | 3A | 3B |
| % Ext. | 5 | 6 | 5 | 8 | 4 | 6 | 5 | 7 |
| Modulus MPa | 0.36 | 0.43 | 0.41 | 0.48 | 0.47 | 0.51 | 0.51 | 0.63 |
| Tear N/mm | 0.05 | 0.09 | 0.09 | 0.1 | 0.1 | 0.18 | 0.13 | 0.19 |
| % Water Content | 79 | 68 | 72 | 65 | 68 | 60 | 60 | 51 |
| Contact Angle | 41 | 46 | 46 | 46 | 49 | 50 | 51 | 57 |
| Hardness | — | — | — | — | — | — | — | — |

TABLE 7

|  | Hydrogel dehydration (wt %) | |
|---|---|---|
| Hydration days | 3A | 3B |
| 1 | 10 | 23 |
| 2 | 17 | 37 |
| 3 | 30 | 61 |
| 4 | 65 | 72 |
| 5 | 70 | 78 |
| 6 | 87 | 80 |
| 7 | 93 | 96 |
| 8 | 98 | 98 |
| 9 | 98 | 98 |
| 10 | 99 | 99 |

3C and 3D

Hydrogel disks/lenses were prepared from each formulation: Examples 3C and 3D. The hydrogel disks/lenses were prepared from a monomer formulation that includes 2-hydroxyethyl methacrylate (HEMA), 1,3-bis(3-methacryloxypropyl)tetramethyldisiloxane (Si-Cross), methyl di(trimethylsiloxy) silylpropylglyceryl methacrylate (SIGMA), glycerin (1,2,3-propanetriol), and diphenyl(2,4,6-trimethylbenzoyl)phosphine oxide (TPO).

TABLE 8

| Components | 3C (wt %) | 3D (wt %) |
|---|---|---|
| HEMA | 63.2 | 55 |
| Si-Cross | 0.4 | 0.4 |
| SIGMA | 3 | 4 |
| GLYCERIN | 33 | 40.1 |
| TPO | 0.4 | 0.5 |
| TOTAL | 100 | 100 |

The monomer formulation mixture was mixed well using a magnetic stirrer and then degassed for about 10 minutes using a dry nitrogen stream. The mixed formulation was added to unpurged polypropylene molds, and the filled molds were placed in an UV chamber for 15 minutes. The lenses were removed from the UV-chamber and allowed to cool to room temperature. The lenses were dry released from the molds. Alternatively, the lenses can be wet released from the mold. Dry release or wet release methods are well known to those of ordinary skill in the contact lens art.

Formulations outlined in Table 8 yielded clear and miscible solutions. The resulting polymer disks/lenses were visually inspected for haze and physical structure under a microscope. An optical grid was used to determine surface damage/fragmentations that may have occurred during the demolding process. The disks/lenses in the dry state were measured using an optimec to determine whether shrinkage occurred.

The resulting disks/lenses were then placed in hydrating media: 2A, 2B, 2C and 2D (Table 2) to evaluate % water content, hydrogel expansion at 24 hour intervals for 10 days (using optimec) and % dehydration at 25° C. and 55% RH (relative humidity) at 24 h intervals for 9 days (using optimec). Data is shown in Tables 9-11.

TABLE 9

| | Hydrogel % expansion in Hydrating Media 2A | |
|---|---|---|
| Hydration days | 3C | 3D |
| 1 | 10 | 15 |
| 2 | 20 | 20 |
| 3 | 30 | 25 |
| 4 | 50 | 30 |
| 5 | 65 | 55 |
| 6 | 68 | 63 |
| 7 | 70 | 67 |
| 8 | 71 | 70 |
| 9 | 71 | 70 |
| 10 | 74 | 76 |

TABLE 10

| | Hydrating media | | | | | | | |
|---|---|---|---|---|---|---|---|---|
| | 2A | | 2B | | 2C | | 2D | |
| Formulation | 3C | 3D | 3C | 3D | 3C | 3D | 3C | 3D |
| % Ext. | 3 | 5 | 8 | 7 | 5 | 4 | 3 | 5 |
| Modulus MPa | 0.31 | 0.40 | 0.44 | 0.49 | 0.48 | 0.59 | 0.55 | 0.7 |
| Tear N/mm | 0.04 | 0.06 | 0.08 | 0.15 | 0.16 | 0.2 | 0.2 | 0.26 |
| % Water Content | 79 | 93 | 72 | 89 | 68 | 85 | 60 | 79 |
| Contact Angle | 44 | 44 | 45 | 44 | 42 | 54 | 56 | 55 |
| Hardness | — | — | — | — | — | — | — | — |

TABLE 11

| | Hydrogel dehydration (wt %) | |
|---|---|---|
| Hydration days | 3C | 3D |
| 1 | 12 | 10 |
| 2 | 24 | 20 |
| 3 | 35 | 21 |
| 4 | 58 | 25 |
| 5 | 61 | 30 |
| 6 | 60 | 43 |
| 7 | 74 | 54 |
| 8 | 76 | 56 |
| 9 | 79 | 60 |
| 10 | 80 | 62 |

3E and 3F

Hydrogel disks/lenses were prepared from each formulation: Examples 3E and 3F. The hydrogel disks/lenses were prepared from a monomer formulation that includes 2-hydroxyethyl methacrylate (HEMA), 1,3-bis(3-methacryloxy-propyl)tetramethyldisiloxane (Si-Cross), methyl di(trimethylsiloxy) silylpropylglyceryl methacrylate (SIGMA), glycerin (1,2,3-propanetriol), and diphenyl(2,4,6-trimethylbenzoyl)phosphine oxide (TPO).

TABLE 12

| Components | 3E (wt %) | 3F (wt %) |
|---|---|---|
| HEMA | 57 | 58 |
| Si-Cross | 0.4 | 0.4 |
| SIGMA | 4 | 3 |
| GLYCERIN | 38.1 | 38.2 |
| TPO | 0.5 | 0.4 |
| TOTAL | 100 | 100 |

The monomer formulation mixture was mixed well using a magnetic stirrer and then degassed for about 10 minutes using a dry nitrogen stream. The mixed formulation was added to unpurged polypropylene molds, and the filled molds were placed in an UV chamber for 15 minutes. The lenses were removed from the UV-chamber and allowed to cool to room temperature. The lenses were dry released from the molds. Alternatively, the lenses can be wet released from the mold. Dry release or wet release methods are well known to those of ordinary skill in the contact lens art.

Formulations outlined in Table 12 yielded clear and miscible solutions. The resulting polymer disks/lenses were visually inspected for haze and physical structure under a microscope. An optical grid was used to determine surface damage/fragmentations that may have occurred during the demolding process. The disks/lenses in the dry state were measured using an optimec to determine whether shrinkage occurred.

The resulting disks/lenses were then placed in hydrating media: 2A, 2B, 2C and 2D (Table 2) to evaluate % water content, hydrogel expansion at 24 hour intervals for 10 days (using optimec) and % dehydration at 25° C. and 55% RH (relative humidity) at 24 h intervals for 9 days (using optimec). Data is shown in Tables 13-15.

TABLE 13

| | Hydrogel % expansion in Hydrating Media 2A | |
|---|---|---|
| Hydration days | 3E | 3F |
| 1 | 10 | 15 |
| 2 | 20 | 20 |
| 3 | 30 | 25 |
| 4 | 50 | 30 |
| 5 | 65 | 55 |
| 6 | 68 | 63 |
| 7 | 70 | 67 |
| 8 | 71 | 70 |
| 9 | 71 | 70 |
| 10 | 74 | 70 |

TABLE 14

| | Hydrating media | | | | | | | |
|---|---|---|---|---|---|---|---|---|
| | 2A | | 2B | | 2C | | 2D | |
| Formulation | 3E | 3F | 3E | 3F | 3E | 3F | 3E | 3F |
| % Ext. | 3 | 5 | 8 | 7 | 5 | 4 | 3 | 5 |
| Modulus MPa | 0.31 | 0.40 | 0.44 | 0.49 | 0.48 | 0.59 | 0.55 | 0.7 |
| Tear N/mm | 0.04 | 0.06 | 0.08 | 0.15 | 0.16 | 0.2 | 0.2 | 0.26 |
| % Water Content | 79 | 93 | 72 | 89 | 68 | 85 | 60 | 79 |
| Contact Angle | 44 | 44 | 45 | 44 | 42 | 54 | 56 | 55 |
| Hardness | — | — | — | — | — | — | — | — |

TABLE 15

| | Hydrogel dehydration (wt %) | |
|---|---|---|
| Hydration days | 3E | 3F |
| 1 | 12 | 19 |
| 2 | 25 | 26 |
| 3 | 32 | 27 |
| 4 | 57 | 27 |
| 5 | 63 | 37 |
| 6 | 69 | 44 |
| 7 | 74 | 53 |
| 8 | 76 | 56 |
| 9 | 72 | 63 |
| 10 | 89 | 67 |

3G

Hydrogel disks/lenses were prepared from each formulation: Example 3G. The hydrogel disks/lenses were prepared from a monomer formulation that includes 2-hydroxyethyl methacrylate (HEMA), 1,3-bis(3-methacryloxypropyl)tetramethyldisiloxane (Si-Cross), methyl di(trimethylsiloxy)silylpropylglyceryl methacrylate (SIGMA), glycerin (1,2,3-propanetriol), and diphenyl(2,4,6-trimethylbenzoyl)phosphine oxide (TPO).

TABLE 16

| Components | 3G (wt %) |
|---|---|
| HEMA | 59 |
| Si-Cross | 0.4 |
| SIGMA | 3 |
| GLYCERIN | 37.2 |
| TPO | 0.4 |
| TOTAL | 100 |

The monomer formulation mixture was mixed well using magnetic stirrer and then degassed for 10 minutes using dry nitrogen stream. The mixed formulation was added to unpurged polypropylene molds, and the filled molds were placed in an UV chamber for 15 minutes. The lenses were removed from the UV-chamber and allowed to cool to room temperature. The lenses were dry released from the molds. Alternatively, the lenses can be wet released from the mold. Dry release or wet release methods are well known to those of ordinary skill in the contact lens art.

The formulation outlined in table 16 yielded clear and miscible solution. The resulting polymer disks/lenses were visually inspected for haze and physical structure under a microscope. An optical grid was used to determine surface damage/fragmentations that may have occurred during the demolding process. The disks/lenses in the dry state were measured using an optimec to verify no excessive shrinking occurred.

The resulting disks/lenses were then placed in hydrating media 2A, 2B, 2C and 2D (Table 2) to evaluate % water content, hydrogel expansion at 24 hour intervals for 10 days (using optimec) and % dehydration at 25° C. and 55% RH at 24 h intervals for 9 days (using optimec). Data is shown in Tables 17-19.

TABLE 17

| | Hydrogel % expansion in Hydrating Media 2A |
|---|---|
| Hydration days | 3G |
| 1 | 10 |
| 2 | 20 |
| 3 | 30 |
| 4 | 50 |
| 5 | 65 |
| 6 | 68 |
| 7 | 70 |
| 8 | 71 |
| 9 | 71 |
| 10 | 72 |

TABLE 18

| Hydrating media | 2A | 2B | 2C | 2D |
|---|---|---|---|---|
| Formulation | 3G | 3G | 3G | 3G |
| % Ext. | 4 | 3 | 6 | 3 |
| Modulus MPa | 0.35 | 0.45 | 0.51 | 0.62 |
| Tear N/mm | 0.07 | 0.16 | 0.21 | 0.31 |
| % Water Content | 80 | 72 | 65 | 54 |
| Contact Angle | 31 | 44 | 42 | 45 |
| Hardness | — | — | — | — |

TABLE 19

| | Hydrogel dehydration (wt %) |
|---|---|
| Hydration days | 3G |
| 1 | 14 |
| 2 | 24 |
| 3 | 34 |
| 4 | 58 |
| 5 | 64 |
| 6 | 62 |
| 7 | 78 |
| 8 | 73 |
| 9 | 76 |
| 10 | 89 |

3H

Hydrogel disks/lenses were prepared from each formulation: Example 3H. The hydrogel disks/lenses were prepared from a monomer formulation that includes 2-hydroxyethyl methacrylate (HEMA), 1 Ethylene glycol dimethacrylate (EGDMA) and diphenyl(2,4,6-trimethylbenzoyl)phosphine oxide (TPO).

TABLE 20

| Components | 3H (wt %) |
|---|---|
| HEMA | 99.1 |
| EGDMA | 0.4 |
| TPO | 0.5 |
| TOTAL | 100 |

The monomer formulation mixture was mixed well using a magnetic stirrer and then degassed for about 10 minutes using a dry nitrogen stream. The mixed formulation was added to unpurged polypropylene molds, and the filled molds were placed in an UV chamber for 15 minutes. The lenses were removed from the UV-chamber and allowed to cool to room temperature. The lenses were dry released from the molds. Alternatively, the lenses can be wet released from the mold. Dry release or wet release methods are well known to those of ordinary skill in the contact lens art.

The formulation outlined in Table 20 yielded clear and miscible solutions. The resulting polymer disks/lenses were visually inspected for haze and physical structure under a microscope. An optical grid was used to determine surface damage/fragmentations that may have occurred during the demolding process. The disks/lenses in the dry state were measured using an optimec to determine whether shrinkage occurred.

The resulting disks/lenses were then placed in hydrating media: 2A, 2B, 2C and 2D (Table 2) to evaluate % water content, hydrogel expansion at 24 hour intervals for 10 days (using optimec) and % dehydration at 25° C. and 55% RH (relative humidity) at 24 h intervals for 9 days (using optimec). Data is shown in Tables 21-23. This data showed that the mechanical properties of the final hydrogel is less than the samples shown in 3A to 3G.

TABLE 21

| Hydration days | Hydrogel % expansion in Hydrating Media 2A 3H |
|---|---|
| 1 | 14 |
| 2 | 23 |
| 3 | 33 |
| 4 | 56 |
| 5 | 61 |
| 6 | 67 |
| 7 | 73 |
| 8 | 77 |
| 9 | 73 |
| 10 | 76 |

TABLE 22

| Hydrating media | 2A | 2B | 2C | 2D |
|---|---|---|---|---|
| Formulation | 3H | 3H | 3H | 3H |
| % Ext. | 4 | 3 | 6 | 3 |
| Modulus MPa | 0.1 | 0.12 | 0.14 | 0.19 |
| Tear N/mm | 0.07 | 0.07 | 0.08 | 0.09 |

TABLE 22-continued

| Hydrating media | 2A | 2B | 2C | 2D |
|---|---|---|---|---|
| % Water Content | 46 | 42 | 38 | 35 |
| Contact Angle | 52 | 67 | 71 | 82 |
| Hardness | — | — | — | — |

TABLE 23

| Hydration days | Hydrogel dehydration (wt %) 3H |
|---|---|
| 1 | 73 |
| 2 | 94 |

3I to 3N

Hydrogel disks/lenses were prepared from each formulation: Examples 3I to 3N. The hydrogel disks/lenses were prepared from a monomer formulation that includes 2-hydroxyethyl methacrylate (HEMA), N-vinyl-2-pyrrolidone (NVP), ethylene glycol dimethacrylate (EGDMA), dionized water and diphenyl(2,4,6-trimethylbenzoyl)phosphine oxide (TPO).

TABLE 24

| Components | 3I (wt %) | 3J (wt %) | 3K (wt %) | 3L (wt %) | 3M (wt %) | 3N (wt %) |
|---|---|---|---|---|---|---|
| HEMA | 5 | 83.6 | 73.5 | 63.6 | 53.5 | 43.6 |
| NVP | 5 | 5 | 5 | 5 | 5 | 5 |
| WATER | 5 | 10 | 20 | 30 | 40 | 50 |
| EGDMA | 1 | 1 | 1 | 1 | 1 | 1 |
| TPO | 0.5 | 0.4 | 0.5 | 0.4 | 0.5 | 0.4 |
| TOTAL | 100 | 100 | 100 | 100 | 100 | 100 |

The monomer formulation mixture was mixed well using a magnetic stirrer and then degassed for about 10 minutes using a dry nitrogen stream. The mixed formulation was added to unpurged polypropylene molds, and the filled molds were placed in an U-V chamber for 15 minutes. The lenses were removed from the UV-chamber and allowed to cool to room temperature. The lenses were dry released from the molds. Alternatively, the lenses can be wet released from the mold. Dry release or wet release methods are well known to those of ordinary skill in the contact lens art.

Formulations outlined in Table 24 yielded clear and miscible solutions. The resulting polymer disks/lenses were visually inspected for haze and physical structure under a microscope. An optical grid was used to determine surface damage/fragmentations that may have occurred during the demolding process. The disks/lenses in the dry state were measured using an optimec to determine whether shrinkage occurred.

The resulting lenses were then placed in hydrating media: 2E (Table 2) to evaluate % water content, hydrogel expansion at 24 hour intervals for 3 days (using optimec) and % dehydration at 25° C. and 55% RH (relative humidity) at 24 h intervals for 7 days (using optimec). Data is shown in Tables 25-27 The data showed that incorporating a diluent, such as water, into the formulation has an impact on the percentage expansion of the hydrogel. It was also observed that, despite the higher diluent content in some experiments, the hydrogel mechanical properties remained within the acceptable level.

TABLE 25

| Hydration | Hydrogel % expansion in Hydating Media 2E | | | | |
|---|---|---|---|---|---|
| days | 3J | 3J | 3K | 3L | 3M | 3N |
| 1 | 37 | 26 | 11 | 4 | 3 | 0 |
| 2 | 37 | 26 | 11 | 5 | 3 | 0 |
| 3 | 37 | 26 | 11 | 5 | 3 | 0 |

TABLE 26

| | Hydrating media 2E | | | | | |
|---|---|---|---|---|---|---|
| Formulation | 3I | 3J | 3K | 3L | 3M | 3N |
| % Ext. | 2 | 3 | 4 | 7 | 6 | 8 |
| Modulus MPa | 0.65 | 0.5 | 0.43 | 0.38 | 0.31 | 0.30 |
| Tear N/mm | 0.45 | 0.34 | 0.35 | 0.30 | 0.23 | 0.19 |
| % Water Content | 51 | 50 | 49 | 51 | 53 | 55 |
| Contact Angle | 47 | 41 | 40 | 39 | 38 | 31 |
| Hardness | — | — | — | — | — | — |

TABLE 27

| | Hydrogel dehydration (wt %) | | | | | |
|---|---|---|---|---|---|---|
| Day | 3I | 3J | 3K | 3L | 3M | 3N |
| 1 | 14 | 11 | 10 | 8 | 6 | 5 |
| 2 | 20 | 19 | 17 | 15 | 9 | 8 |
| 3 | 24 | 21 | 20 | 18 | 11 | 10 |
| 4 | 39 | 29 | 25 | 24 | 20 | 15 |
| 5 | 45 | 39 | 34 | 31 | 29 | 21 |
| 6 | 50 | 47 | 43 | 42 | 40 | 29 |
| 7 | 59 | 51 | 49 | 47 | 43 | 36 |

3O to 3T

Hydrogel disks/lenses were prepared from each formulation: Examples 3O to 3T. The hydrogel disks/lenses were prepared from a monomer formulation that includes glycidyl methacrylate (GMMA), N-vinyl-2-pyrrolidone (NVP), ethylene glycol dimethacrylate (EGDMA), Polyethylene glycol (PEG 400) and diphenyl(2,4,6-trimethylbenzoyl)phosphine oxide (TPO).

TABLE 28

| Components | 3O (wt %) | 3P (wt %) | 3Q (wt %) | 3R (wt %) | 3S (wt %) | 3T (wt %) |
|---|---|---|---|---|---|---|
| GMMA | 88.5 | 83.6 | 73.5 | 63.6 | 53.5 | 43.6 |
| NVP | 5 | 5 | 5 | 5 | 5 | 5 |
| PEG 400 | 5 | 10 | 20 | 30 | 40 | 50 |
| EGDMA | 1 | 1 | 1 | 1 | 1 | 1 |
| TPO | 0.5 | 0.4 | 0.5 | 0.4 | 0.5 | 0.4 |
| TOTAL | 100 | 100 | 100 | 100 | 100 | 100 |

The monomer formulation mixture was mixed well using a magnetic stirrer and then degassed for about 10 minutes using a dry nitrogen stream. The mixed formulation was added to unpurged polypropylene molds, and the filled molds were placed in an UV chamber for 15 minutes. The lenses were removed from the UV-chamber and allowed to cool to room temperature. The lenses were dry released from the molds. Alternatively, the lenses can be wet released from the mold. Dry release or wet release methods are well known to those of ordinary skill in the contact lens art.

Formulations outlined in Table 28 yielded clear and miscible solutions. The resulting polymer disks/lenses were visually inspected for haze and physical structure under a microscope. An optical grid was used to determine surface damage/fragmentations that may have occurred during the demolding process. Lenses in the dry state were measured using an optimec to determine whether shrinkage occurred.

The resulting lenses were then placed in hydrating media: 2E (Table 2) to evaluate % water content, hydrogel expansion at 24 hour intervals for 3 days (using optimec) and % dehydration at 25° C. and 55% RH (relative humidity) at 24 h intervals for 7 days (using optimec). Data is shown in Tables 29-31. The data showed that incorporating a diluent, such as PEG 400, into the formulation has an impact on the percentage expansions of the hydrogel. It was also observed that despite the higher diluent content in some experiments, the hydrogel mechanical properties remained within the acceptable level.

TABLE 29

| Hydration | Hydrogel % expansion in 2E | | | | | |
|---|---|---|---|---|---|---|
| days | 3O | 3P | 3Q | 3R | 3S | 3T |
| 1 | 41 | 31 | 13 | 6 | 2 | −1 |
| 2 | 38 | 30 | 10 | 5 | 1 | −2 |
| 3 | 38 | 28 | 10 | 5 | 3 | −2 |

TABLE 30

| | Hydrating media 2E | | | | | |
|---|---|---|---|---|---|---|
| Formulation | 3O | 3P | 3Q | 3R | 3S | 3T |
| % Ext. | 2 | 3 | 4 | 7 | 6 | 8 |
| Modulus MPa | 0.78 | 0.59 | 0.49 | 0.41 | 0.39 | 0.32 |
| Tear N/mm | 0.55 | 0.45 | 0.41 | 0.39 | 0.29 | 0.20 |
| % Water Content | 55 | 54 | 50 | 54 | 56 | 49 |
| Contact Angle | 35 | 31 | 30 | 29 | 30 | 30 |
| Hardness | — | — | — | — | — | — |

TABLE 31

| | Hydrogel dehydration (wt %) | | | | | |
|---|---|---|---|---|---|---|
| Day | 3O | 3P | 3Q | 3R | 3S | 3T |
| 1 | 10 | 10 | 9 | 6 | 6 | 4 |
| 2 | 18 | 17 | 16 | 14 | 8 | 7 |
| 3 | 20 | 20 | 18 | 15 | 10 | 9 |
| 4 | 31 | 25 | 21 | 23 | 18 | 14 |
| 5 | 44 | 38 | 31 | 30 | 25 | 19 |
| 6 | 49 | 43 | 42 | 40 | 39 | 35 |
| 7 | 54 | 50 | 46 | 46 | 44 | 35 |

3U to 3Z

Hydrogel disks/lenses were prepared from each formulation: Examples 3U to 3Z. The hydrogel disks/lenses were prepared from a monomer formulation that includes glycidyl methacrylate (GMMA), N-vinyl-2-pyrrolidone (NVP), ethylene glycol dimethacrylate (EGDMA), Polyethylene glycol (PEG 400) and diphenyl(2,4,6-trimethylbenzoyl)phosphine oxide (TPO).

TABLE 32

| Components | 3U (wt %) | 3V (wt %) | 3W (wt %) | 3X (wt %) | 3Y (wt %) | 3Z (wt %) |
|---|---|---|---|---|---|---|
| GMMA | 48.5 | 43.6 | 33.5 | 23.6 | 13.5 | 3.6 |
| NVP | 5 | 5 | 5 | 5 | 5 | 5 |
| SIGMA | 40 | 40 | 40 | 40 | 40 | 40 |
| PEG 400 | 5 | 10 | 20 | 30 | 40 | 50 |
| EGDMA | 1 | 1 | 1 | 1 | 1 | 1 |
| TPO | 0.5 | 0.4 | 0.5 | 0.4 | 0.5 | 0.4 |
| TOTAL | 100 | 100 | 100 | 100 | 100 | 100 |

The monomer formulation mixture was mixed well using a magnetic stirrer and then degassed for about 10 minutes using a dry nitrogen stream. The mixed formulation was added to unpurged polypropylene molds, and the filled molds were placed in an UV chamber for 15 minutes. The lenses were removed from the UV-chamber and allowed to cool to room temperature. The lenses were dry released from the molds. Alternatively, the lenses can be wet released from the mold. Dry release or wet release methods are well known to those of ordinary skill in the contact lens art.

Formulations outlined in Table 32 yielded clear and miscible solutions. The resulting polymer disks/lenses were visually inspected for haze and physical structure under a microscope. An optical grid was used to determine surface damage/fragmentations that may have occurred during the demolding process. Lenses in the dry state were measured using an optimec to determine whether shrinkage occurred.

The resulting lenses were then placed in hydrating media: 2E (Table 2) to evaluate % water content, hydrogel expansion at 24 hour intervals for 3 days (using optimec) and % dehydration at 25° C. and 55% RH (relative humidity) at 24 h intervals for 7 days (using optimec). Data is shown in Tables 33-35. The data showed that incorporating a diluent, such as PEG 400, into the formulation has an impact on the percentage expansions of the hydrogel. It was also observed that despite the higher diluent content in some experiments, the hydrogel mechanical properties remained within the acceptable level.

TABLE 33

| Hydration | Hydrogel % expansion in 2E | | | | | |
|---|---|---|---|---|---|---|
| days | 3U | 3V | 3W | 3X | 3Y | 3Z |
| 1 | 41 | 31 | 13 | 6 | 2 | 0 |
| 2 | 38 | 30 | 10 | 5 | 1 | −2 |
| 3 | 38 | 28 | 10 | 5 | 3 | −2 |

TABLE 34

| | Hydrating media 2E | | | | | |
|---|---|---|---|---|---|---|
| Formulation | 3U | 3V | 3W | 3X | 3Y | 3Z |
| % Ext. | 5 | 5 | 6 | 7 | 7 | 8 |
| Modulus MPa | 0.88 | 0.79 | 0.51 | 0.49 | 0.45 | 0.41 |
| Tear N/mm | 0.55 | 0.45 | 0.41 | 0.39 | 0.29 | 0.20 |
| % Water Content | 36 | 35 | 30 | 34 | 37 | 29 |
| Contact Angle | 46 | 41 | 40 | 36 | 36 | 32 |
| Hardness | — | — | — | — | — | — |

TABLE 35

| | Hydrogel dehydration (wt %) | | | | | |
|---|---|---|---|---|---|---|
| Day | 3U | 3V | 3W | 3X | 3Y | 3Z |
| 1 | 14 | 13 | 12 | 9 | 10 | 8 |
| 2 | 24 | 20 | 19 | 18 | 12 | 9 |
| 3 | 28 | 23 | 21 | 19 | 15 | 13 |
| 4 | 31 | 28 | 24 | 22 | 21 | 18 |
| 5 | 44 | 39 | 34 | 33 | 29 | 21 |
| 6 | 49 | 46 | 44 | 41 | 40 | 39 |
| 7 | 57 | 53 | 49 | 47 | 47 | 39 |

3AA to 3FF

Silicon hydrogel disks/lenses were prepared from each formulation: Examples 3AA to 3FF. The hydrogel disks/lenses were prepared from a monomer formulation that includes glycidyl methacrylate (GMMA), N-vinyl-2-pyrrolidone (NVP), ethylene glycol dimethacrylate (EGDMA), Amyl alcohol and diphenyl(2,4,6-trimethylbenzoyl)phosphine oxide (TPO).

TABLE 36

| Components | 3AA (wt %) | 3BB (wt %) | 3CC (wt %) | 3DD (wt %) | 3EE (wt %) | 3FF (wt %) |
|---|---|---|---|---|---|---|
| GMMA | 48.5 | 43.6 | 33.5 | 23.6 | 13.5 | 3.6 |
| NVP | 5 | 5 | 5 | 5 | 5 | 5 |
| SIGMA | 40 | 40 | 40 | 40 | 40 | 40 |
| Amyl alcohol | 5 | 10 | 20 | 30 | 40 | 50 |
| EGDMA | 1 | 1 | 1 | 1 | 1 | 1 |
| TPO | 0.5 | 0.4 | 0.5 | 0.4 | 0.5 | 0.4 |
| TOTAL | 100 | 100 | 100 | 100 | 100 | 100 |

The monomer formulation mixture was mixed well using a magnetic stirrer and then degassed for about 10 minutes using a dry nitrogen stream. The mixed formulation was added to unpurged polypropylene molds, and the filled molds were placed in an UV chamber for 15 minutes. The lenses were removed from the UV-chamber and allowed to cool to room temperature. The lenses were dry released from the molds. Alternatively, the lenses can be wet released from the mold. Dry release or wet release methods are well known to those of ordinary skill in the contact lens art.

Formulations outlined in Table 36 yielded clear and miscible solutions. The resulting polymer disks/lenses were visually inspected for haze and physical structure under a microscope. An optical grid was used to determine surface damage/fragmentations that may have occurred during the demolding process. Lenses in the dry state were measured using an optimec to determine whether shrinkage occurred.

The resulting disks/lenses were then placed in hydrating media: 2E (Table 2) to evaluate % water content, hydrogel expansion at 24 hour intervals for 3 days (using optimec) and % dehydration at 25° C. and 55% RH (relative humidity) at 24 h intervals for 7 days (using optimec). Data is shown in Tables 37-39. The data showed that incorporating a diluent, such as amyl alcohol, into the formulation has an impact on the percentage expansions of the hydrogel. It was also observed that despite the higher diluent content in some experiments, the hydrogel mechanical properties remained within the acceptable level.

TABLE 37

| Hydration | Hydrogel % expansion in 2E | | | | | |
|---|---|---|---|---|---|---|
| days | 3AA | 3BB | 3CC | 3DD | 3EE | 3FF |
| 1 | 36 | 15 | 6 | 4 | 2 | 0 |
| 2 | 33 | 12 | 5 | 3 | 1 | −2 |
| 3 | 31 | 11 | 5 | 3 | 1 | −2 |

TABLE 38

| | Hydrating media 2E | | | | | |
|---|---|---|---|---|---|---|
| Formulation | 3AA | 3BB | 3CC | 3DD | 3EE | 3FF |
| % Ext. | 2 | 3 | 3 | 5 | 5 | 6 |
| Modulus MPa | 0.76 | 0.65 | 0.54 | 0.44 | 0.41 | 0.35 |
| Tear N/mm | 0.65 | 0.55 | 0.43 | 0.32 | 0.21 | 0.18 |
| % Water Content | 31 | 29 | 22 | 21 | 27 | 21 |
| Contact Angle | 51 | 48 | 42 | 41 | 40 | 40 |
| Hardness | — | — | — | — | — | — |

TABLE 39

| | Hydrogel dehydration (wt %) | | | | | |
|---|---|---|---|---|---|---|
| Day | 3AA | 3BB | 3CC | 3DD | 3EE | 3FF |
| 1 | 11 | 15 | 17 | 12 | 11 | 10 |
| 2 | 26 | 25 | 25 | 21 | 15 | 14 |
| 3 | 29 | 28 | 28 | 21 | 18 | 17 |
| 4 | 35 | 31 | 31 | 23 | 22 | 19 |
| 5 | 49 | 41 | 38 | 37 | 34 | 28 |
| 6 | 62 | 59 | 55 | 51 | 49 | 45 |
| 7 | 78 | 65 | 62 | 60 | 59 | 55 |

Example 4. Insertion of Non-Expanding Components in Low/Non-Expanding Lens Formulations

4A

A circular disk/lens with 7 mm diameter was prepared from the hydrogel formulation 3N, 3T, 3Z or silicon hydrogel formulation 3FF using UV-light curing with 37 micron thickness. A 2.5 mm square polypropylene sheet with 20 micron thickness was placed on the middle of the circular disk and a second circular disk was prepared on the top of the first 7 mm disk by adding the liquid monomer and subsequently, UV-curing. The hydration of the final two layer films with the polypropylene square disk in the middle showed no distortions or irregularity in the hydrated films. With the same experimental setup, the polypropylene square film was sandwiched between two curved films like a contact lens and the hydration of the lens in 0.9% saline showed no distortion or curling around the polypropylene film.

4B

A circular disk/lens with 7 mm diameter was prepared from the hydrogel formulation 3N, 3T, 3Z or silicon hydrogel formulation 3FF using UV-light curing with 37 micron thickness. A 2.5 mm square polysiloxane sheet with 20 micron thickness was placed on the middle of the circular disk and a second circular disk was prepared on the top of the first 7 mm disk by adding the liquid monomer and subsequently, UV-curing. The hydration of the final two layer films with the polysiloxane square disk in the middle showed no distortions or irregularity in the hydrated films. With the same experimental setup, the polysiloxane square film was sandwiched between two curved films like a contact lens and the hydration of the lens in 0.9% saline showed no distortion or curling or benching around the polysiloxane sheet.

4C

A circular disk/lens with 7 mm diameter was prepared from the hydrogel formulation 3N, 3T, 3Z or silicon hydrogel formulation 3FF using UV-light curing with 37 micron thickness. A 2.5 mm square copper sheet with 20 micron thickness was placed on the middle of the circular disk and a second circular disk was prepared on the top of the first 7 mm disk by adding the liquid monomer and subsequently, UV-curing. The hydration of the final two layer films with the copper square disk in the middle showed no distortions or irregularity in the hydrated films. With the same experimental setup, the copper square film was sandwiched between two curved films like a contact lens and the hydration of the lens in 0.9% saline showed no distortion or curling around the copper square disk.

Overall, the addition of a siloxane monomer (SIGMA), crosslinker (Si-cross or EGDMA) and humectant (glycerine and PEG400) in formulations 3A to 3G and 3O to 3Z improved the dehydration characteristics and mechanical properties of the hydrogel polymer when compared to pHEMA (3H). It is also shown that the addition of diluents such as PEG 400, water and amyl alcohol in varying concentrations into hydrogel formulations (3I to 3FF) can be used to control the % expansion of the hydrogels while maintaining acceptable mechanical properties. It was also shown in examples 4A to 4C that low/non-expanding lens formulations 3N, 3T, and 3Z can tolerate the insertion of non-expanding metallic and hydrophobic components. Formulations 3A to 3G and 3I to 3FF showed less than 10% extractables with good formulation compatibility and cure conditions. Formulation variations (3A to 3G and 3I to 3FF) show extended dehydration up to about 10 days when compared to a conventional pHEMA hydrogel (3H) with a 2 day dehydration. Formulation variations (3A to 3G and 3I to 3FF) show improved mechanical properties with modulus ranging from about 0.3 to about 0.6 MPa and tear strength ranging from about 0.05 to about 0.2 N/mm when compared to a conventional pHEMA hydrogel (3H) with a modulus ranging from 0.1 to 0.2 MPa and tear strength of 0.07 to 0.09 N/mm. It was also shown that despite the hydrogel expansion, the hydrogel mechanical properties remained within the acceptable level.

This written description uses examples to disclose the invention, including the best mode, and also to enable any person skilled in the art to make and use the invention. Many modifications of the exemplary embodiments of the invention disclosed above will readily occur to those skilled in the art. Accordingly, the invention is to be construed as including all structure and methods that fall within the scope of the appended claims. Unless otherwise specified, the recitation of a genus of elements, materials or other components, from which an individual component or mixture of components can be selected, is intended to include all possible subgeneric combinations of the listed components and mixtures thereof.

What is claimed is:

1. A composition comprising at least one hydrophilic monomer, at least one vinyl containing monomer, a siloxane cross-linker, and at least one diluent, wherein said at least one diluent comprises water and/or at least one humectant, wherein the siloxane crosslinker has a molecular weight from about 200 to about 6000 g/mol.

2. The composition of claim 1, wherein said at least one humectant is selected from the group consisting of monoalcohols, glycols, polymers thereof, alpha hydroxyl acids, glyceryl triacetate, polymeric polyols, sugar alcohols, sugar polyols, and a combination thereof.

3. The composition of claim 1, wherein the siloxane crosslinker improves mechanical propertie(s) and/or dimensional stability of the hydrogel polymer compared to a conventional hydrogel polymer not prepared from a siloxane crosslinker.

4. The composition of claim 1, wherein the functional group of the siloxane crosslinker is an (alkyl)$_2$Si-O bond, optionally, wherein the functional group of the siloxane crosslinker is a Me$_2$Si-O bond.

5. The composition of claim 1, wherein the siloxane crosslinker comprises 1,3-bis(3 methacryloxypropyl)tetramethyldisiloxane.

6. The composition of claim 1, wherein the siloxane crosslinker improves the modulus and elasticity of hydrogel polymers with water content greater than 50%.

7. The composition of claim 1, wherein the at least one vinyl containing monomer comprises at least one silicone monomer.

8. The composition of claim 7, wherein the silicone monomer comprises a siloxanylalkyl methacrylate; wherein the silicone monomer is methyl di(trimethylsiloxy) silylpropylglyceryl methacrylate (SIGMA); or wherein the silicone monomer is selected from the group consisting of tris-(trimethylsiloxy)-3-methacryloxypropyl methacrylate (Tris), 3-methacryloxy-2-hydroxypropyloxy) propylbis (trimethylsiloxy)-methylsilane (Sigma), or a mixture thereof.

9. The composition of claim 1, wherein the hydrophilic monomer is selected from hydroxyethylmethacrylate (HEMA), glycidyl methacrylate (GMMA), dimethylacrylamide (DMA), 3-(tris-(trimethylsiloxy)silyl)propyl methacrylate (TRIS), hydroxypropyloxy)propylbis(trimethylsiloxy)-methylsilane (SIGMA), or combinations thereof.

10. The composition of claim 1, further comprising at least one photoinitiator.

11. The composition of claim 1, wherein said at least one hydrophilic monomer is present from about 35% to about 75% by weight; wherein said at least one vinyl containing monomer is present from about 2% to about 4% by weight; the siloxane cross-linker is present from about 0.4% to about 2% by weight; and said at least one diluent is present from about 10% to about 55% by weight.

12. The composition of claim 1, wherein said at least one humectant is selected from the group consisting of $C_1$-$C_8$ alcohols, propylene glycol, butylene glycol, hexylene glycol, polyethylene glycol, polypropylene glycol, polybutylene glycol, lactic acid, polydextrose, glycerol, sorbitol, xylitol, maltitol, and a combination thereof; and/or wherein said at least one humectant is non-polymerizing.

13. The composition of claim 1, wherein the molecular weight is from about 200 to about 1000 g/mol.

14. The composition of claim 1, wherein the composition is a formulation.

15. A hydrogel polymer prepared from the composition of claim 1.

16. The hydrogel polymer of claim 15, wherein the hydrogel polymer has improved water adsorption and/or retention capabilities compared to a conventional hydrogel polymer without said at least one diluent.

17. The hydrogel polymer of claim 15, wherein the hydrogel polymer has an electrical conductivity for an extended period of time from about one day to about seventeen days.

18. The hydrogel polymer of claim 15, wherein the hydrogel polymer has a moduli from about 0.3 MPa to about 0.6 MPa.

19. A contact lens prepared from the hydrogel polymer of claim 15.

20. The contact lens of claim 19, wherein the contact lens, in a saline solution, has less than about 6% expansion.

21. The contact lens of claim 19, wherein the contact lens is capable of accommodating a further component without affecting at least one property of the lens, wherein said at least one property is selected from shape and optics, and wherein the further component is at least one sheet comprising at least one metal and/or at least one polymer.

22. The hydrogel polymer of claim 15, wherein the polymer possesses a water content of at least about 40% by weight.

* * * * *